US012670542B2

(12) United States Patent
Gilmutdinov et al.

(10) Patent No.: US 12,670,542 B2
(45) Date of Patent: Jun. 30, 2026

(54) JOINT OBJECTS IMAGE SIGNAL PROCESSING IN TEMPORAL DOMAIN

(71) Applicant: HUAWEI TECHNOLOGIES CO., LTD., Shenzhen (CN)

(72) Inventors: Marat Ravilevich Gilmutdinov, Saint Petersburg (RU); Elena Alexandrovna Alshina, Munich (DE); Nickolay Dmitrievich Egorov, Saint Petersburg (RU); Dmitry Vadimovich Novikov, Saint Petersburg (RU); Anton Igorevich Veselov, Saint Petersburg (RU); Kirill Aleksandrovich Malakhov, Saint Petersburg (RU); Nikita Vyacheslavovich Ustiuzhanin, Saint Petersburg (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 436 days.

(21) Appl. No.: 17/981,153

(22) Filed: Nov. 4, 2022

(65) Prior Publication Data
US 2023/0127009 A1 Apr. 27, 2023

Related U.S. Application Data

(63) Continuation of application No. PCT/RU2021/050113, filed on Apr. 28, 2021.

(30) Foreign Application Priority Data

May 6, 2020 (WO) ................ PCT/EP2020/062557

(51) Int. Cl.
*G06K 9/62* (2022.01)
*G06F 18/2413* (2023.01)
(Continued)

(52) U.S. Cl.
CPC ........ *G06T 3/4015* (2013.01); *G06F 18/2414* (2023.01); *G06V 10/30* (2022.01);
(Continued)

(58) Field of Classification Search
None
See application file for complete search history.

(56) References Cited

U.S. PATENT DOCUMENTS

| | | | | | |
|---|---|---|---|---|---|
| 5,878,415 | A | * | 3/1999 | Olds | ................... G06F 21/6218 |
| | | | | | 707/999.009 |
| 8,228,995 | B2 | * | 7/2012 | Kondo | ..................... H04N 9/30 |
| | | | | | 375/240.26 |

(Continued)

FOREIGN PATENT DOCUMENTS

| | | | | | | |
|---|---|---|---|---|---|---|
| JP | | 2009145991 | A | * | 7/2009 | |
| JP | | 2019083467 | A | * | 5/2019 | |
| KR | | 101848507 | B1 | * | 4/2018 | ......... G06F 3/04883 |

OTHER PUBLICATIONS

JP-2019083467-A (machine translation) (Year: 2019).*
(Continued)

*Primary Examiner* — Feng Niu
(74) *Attorney, Agent, or Firm* — Leydig, Voit & Mayer, Ltd.

(57) ABSTRACT

The present disclosure relates to pre-processing of video images. In particular, the video images are pre-processed in an object-based manner, i.e., by applying different pre-processing to different objects detected in the image. Moreover, the pre-processing is applied to a group of images. As such, object detection is performed in a plurality of images and the pre-processing for the plurality of images may be adapted to the decoded images and is applied to the decoded images.

20 Claims, 10 Drawing Sheets

(51) Int. Cl.

| | |
|---|---|
| *G06T 3/4015* | (2024.01) |
| *G06V 10/30* | (2022.01) |
| *G06V 10/74* | (2022.01) |
| *G06V 10/82* | (2022.01) |
| *G06V 20/40* | (2022.01) |
| *H04N 19/85* | (2014.01) |

(52) U.S. Cl.
CPC ............ *G06V 10/761* (2022.01); *G06V 10/82* (2022.01); *G06V 20/41* (2022.01); *H04N 19/85* (2014.11)

(56) References Cited

U.S. PATENT DOCUMENTS

| | | | | |
|---|---|---|---|---|
| 8,254,717 | B2 * | 8/2012 | Velthoven | H04N 19/14 348/27 |
| 8,374,392 | B2 * | 2/2013 | Hu | G06F 18/214 382/103 |
| 8,374,457 | B1 * | 2/2013 | Wang | G06T 5/70 382/302 |
| 8,786,625 | B2 * | 7/2014 | Cote | H04N 23/88 345/589 |
| 8,855,434 | B2 * | 10/2014 | Sato | H04N 19/157 382/233 |
| 8,948,506 | B2 * | 2/2015 | Saito | H04N 25/133 382/165 |
| 9,042,599 | B2 * | 5/2015 | Du | G06V 10/96 382/103 |
| 9,147,230 | B2 * | 9/2015 | Saito | H04N 9/646 |
| 9,225,897 | B1 * | 12/2015 | Sehn | H04N 23/63 |
| 9,386,287 | B2 * | 7/2016 | Hatano | G06T 3/4015 |
| 9,398,280 | B2 * | 7/2016 | Nikkanen | H04N 9/643 |
| 9,639,762 | B2 * | 5/2017 | Chakraborty | G06V 20/47 |
| 10,055,821 | B2 * | 8/2018 | Glotzbach | G06T 5/50 |
| 10,511,846 | B1 | 12/2019 | Chen et al. | |
| 10,521,885 | B2 * | 12/2019 | Takahashi | G06T 5/70 |
| 10,893,283 | B2 * | 1/2021 | Chen | H04N 19/167 |
| 11,113,969 | B2 * | 9/2021 | Avedisov | G08G 1/096775 |
| 11,657,481 | B2 * | 5/2023 | Sytnik | G06T 5/77 382/156 |
| 11,677,918 | B2 * | 6/2023 | Cho | G06T 3/4015 348/222.1 |
| 11,995,895 | B2 * | 5/2024 | Shin | G06T 1/20 |
| 12,022,189 | B2 * | 6/2024 | Jung | H04N 23/611 |
| 2005/0133708 | A1 * | 6/2005 | Eberhard | A61B 6/025 250/234 |
| 2007/0165140 | A1 * | 7/2007 | Kondo | G06T 3/4015 348/E9.037 |
| 2008/0219582 | A1 * | 9/2008 | Kirenko | H04N 19/176 375/E7.193 |
| 2009/0237563 | A1 * | 9/2009 | Doser | H04N 5/145 348/E9.055 |
| 2009/0278953 | A1 * | 11/2009 | Velthoven | H04N 19/117 348/222.1 |
| 2010/0027906 | A1 * | 2/2010 | Hara | G06T 7/13 382/266 |
| 2010/0265353 | A1 * | 10/2010 | Koyama | H04N 23/951 348/222.1 |
| 2010/0296702 | A1 * | 11/2010 | Hu | G06V 30/19147 382/103 |
| 2011/0058609 | A1 | 3/2011 | Chaudhury et al. | |
| 2011/0249142 | A1 | 10/2011 | Brunner | |
| 2012/0081385 | A1 * | 4/2012 | Cote | H04N 23/611 345/589 |
| 2012/0114172 | A1 * | 5/2012 | Du | G06V 40/165 382/103 |
| 2013/0028531 | A1 * | 1/2013 | Sato | H04N 19/82 382/233 |
| 2013/0114713 | A1 * | 5/2013 | Bossen | H04N 19/61 375/240.12 |
| 2013/0216130 | A1 * | 8/2013 | Saito | G06T 5/90 382/167 |
| 2013/0272605 | A1 * | 10/2013 | Saito | H04N 23/843 382/167 |
| 2013/0273968 | A1 * | 10/2013 | Rhoads | H04W 4/50 455/566 |
| 2014/0078338 | A1 * | 3/2014 | Hatano | G06T 3/4015 348/222.1 |
| 2014/0176548 | A1 * | 6/2014 | Green | G06T 7/251 382/199 |
| 2015/0054980 | A1 | 2/2015 | Nikkanen et al. | |
| 2015/0161773 | A1 * | 6/2015 | Takahashi | G06V 10/28 382/173 |
| 2016/0070963 | A1 * | 3/2016 | Chakraborty | G06F 18/24133 386/241 |
| 2017/0221186 | A1 * | 8/2017 | Glotzbach | G06T 7/246 |
| 2018/0089906 | A1 * | 3/2018 | Alkouh | G06T 17/00 |
| 2020/0029075 | A1 * | 1/2020 | Sato | H04N 19/157 |
| 2020/0099944 | A1 * | 3/2020 | Chen | H04L 47/29 |
| 2020/0178809 | A1 * | 6/2020 | Wang | A61B 5/0077 |
| 2020/0241100 | A1 * | 7/2020 | Rehwald | G01R 33/5608 |
| 2020/0286382 | A1 * | 9/2020 | Avedisov | G08G 1/096775 |
| 2020/0380274 | A1 * | 12/2020 | Shin | G06T 7/292 |
| 2022/0182590 | A1 * | 6/2022 | Cho | G06N 3/045 |
| 2023/0063005 | A1 * | 3/2023 | Nakao | G01N 33/007 |
| 2023/0091780 | A1 * | 3/2023 | Jung | H04N 23/611 348/239 |
| 2023/0281764 | A1 * | 9/2023 | Sytnik | G06T 7/0012 382/156 |

OTHER PUBLICATIONS

KR-101848507-B1 (machine translation) (Year: 2018).*

JP-2009145991-A (machine translation) (Year: 2009).*

Nasser et al., "A novel generic dictionary-based denoising method for improving noisy and densely packed nuclei segmentation in 3D time-lapse fluorescence microscopy images." Sci Rep. Apr. 4, 2019;9(1):5654. doi: 10.1038/s41598-019-41683-3. PMID: 30948741; PMCID: PMC6449358. (Year: 2019).*

Lloyd "Least Squares Quantization in Pcm," IEEE Transactions on Information Theory, vol. 28, No. 2, pp. 129-137, Institute of Electrical and Electronics Engineers, New York, New York (Mar. 1982).

Park "Architectural Analysis of a Baseline ISP Pipeline," in KYUNG (Ed.) "Theory and Applications of Smart Cameras," KAIST Research Series, pp. 21-45, Springer, Dordrecht, Netherlands (Jul. 2015).

Redmon et al., "YOLOv3: An Incremental Improvement," Computer Vision and Pattern Recognition, arXiv:1804.02767v1 [cs.CV], Total 6 pages (Apr. 2018).

Zhang et al., "Joint Face Detection and Alignment using Multi-task Cascaded Convolutional Networks," IEEE Signal Processing Letters, vol. 23, No. 10, pp. 1-5, Institute of Electrical and Electronics Engineers, New York, New York (Oct. 2016).

Schroff et al., "FaceNet: A Unified Embedding for Face Recognition and Clustering," 2015 IEEE Conference on Computer Vision and Pattern Recognition (CVPR), Total 10 pages, Institute of Electrical and Electronics Engineers, New York, New York (last revised: Jun. 17, 2015).

Van De Weijer et al., "Color Constancy based on the Grey-Edge Hypothesis," IEEE International Conference on mage Processing 2005, Total 4 pages, Institute of Electrical and Electronics Engineers, New York, New York (Sep. 2005).

He et al., "Guided Image Filtering," IEEE Transactions on Pattern Analysis and Machine Intelligence, vol. 35, No. 6, pp. 1397-1409, DOI: 10.1109/TPAMI.2012.213, Institute of Electrical and Electronics Engineers, New York, New York (Jun. 2013).

Buades et al., "A non-local algorithm for image denoising," 2005 IEEE Computer Society Conference on Computer Vision and Pattern Recognition (CVPR'05), Total 6 pages, Institute of Electrical and Electronics Engineers, New York, New York (Jun. 20-25, 2005).

Hirakawa et al., "Adaptive Homogeneity-Directed Demosaicing Algorithm," IEEE Transactions on Image Processing, vol. 14, No. 3, pp. 360-369, DOI: 10.1109/TIP.2004.838691, Institute of Electrical and Electronics Engineers, New York, New York (Mar. 2005).

Menon et al., "Demosaicing With Directional Filtering and a posteriori Decision," IEEE Transactions on Image Processing, vol.

(56) References Cited

OTHER PUBLICATIONS

16, No. 1, pp. 132-141, DOI: 10.1109/TIP.2006.884928, Institute of Electrical and Electronics Engineers, New York, New York (Jan. 2007).

Remez et al., "Deep Class-Aware Image Denoising," 2017 International Conference on Sampling Theory and Applications (SampTA), Tallin, Estonia, pp. 138-142, DOI: 10.1109/SAMPTA.2017. 8024474, Institute of Electrical and Electronics Engineers, New York, New York (Jul. 3-7, 2017).

Liao et al., "Video-based Person Re-identification via 3D Convolutional Networks and Non-local Attention," Computer Vision and Pattern Recognition, pp. 1-9, Asian Conference on Computer Vision (ACCV) (last revised: Apr. 28, 2018).

Ramanath et al., "Color Image Processing Pipeline in Digital Still Cameras," IEEE Signal Processing Magazine, pp. 1-20 (2004).

Martinez-Ponte et al., "Robust Human Face Hiding Ensuring Privacy," 6th International Workshop on Image Analysis for Multimedia Interactive Services, XP055012519, Montreux, Switzerland, Total 4 pages (Apr. 13, 2005).

Hukkelas, "DeepPrivacy: A Generative Adversarial Network for Face Anonymization," ISVC 2019, https://doi.org/10.1007/978-3-030-33720-9_44, XP047545421, Total 14 pages (Oct. 21, 2019).

* cited by examiner

Temporal Object-dependent ISP

ISP pipeline a)

b)

c)

d)

1

JOINT OBJECTS IMAGE SIGNAL PROCESSING IN TEMPORAL DOMAIN

CROSS-REFERENCE TO RELATED APPLICATIONS

This application is a continuation of International Application No. PCT/RU2021/050113, filed on Apr. 28, 2021, which claims priority to International Patent Application No. PCT/EP2020/062557, filed on May 6, 2020. The disclosures of the aforementioned applications are hereby incorporated by reference in their entireties.

TECHNICAL FIELD

The present disclosure relates to video processing. In particular, the present disclosure relates to methods and apparatuses for processing of video frames in a raw video format.

BACKGROUND

In recent years, consuming of high quality digital content such as still images and videos became regular and even essential for lots of people all around the world. Requirements for quality of such content became higher and higher every year. Therefore, improvement of products such as image processing apparatuses and the corresponding methods, which are used to obtain such digital content is a crucial task. In still image and video capturing devices the imaging hardware is usually paired with some capable image signal processing (ISP) algorithms to transform data from a sensor data format (also known as "raw" data) to a perceptually pleasing content.

Array photo sensors used to capture images and videos capture intensity of light over the entire light spectrum. In order to capture colorful images and videos, cameras are often configured to capture an image of a scene on the basis of (i.e. through) a Color Filter Array (CFA) pattern. According to this CFA pattern, camera's sensor measures only one of a plurality of primary colors in each spatial point, i.e. for each pixel. In other words, each pixel captures (measures) intensity of a specific color component of a particular color space.

Most widely used CFA pattern is called Bayer pattern. The Bayer pattern determines arrangement of color filters on the pixel array of the image sensor. The color filter on each pixel results in each pixel measuring one of the following primary colors: red (R), green (G), or blue (B). As the green color component is more perceptually significant than red and blue, in each 2×2 pixel square of the image sensor there are two green filers, one red filter and one blue filter. Typically, the two corresponding green pixels are located on the diagonal or on the anti-diagonal, whereas the remaining two (red and blue, or blue and red) pixels are located respectively on the anti-diagonal or on the diagonal of the 2×2 pixel square.

Data obtained in such a format requires specific processing in order to obtain an RGB image, for instance, to be displayed on a display of a mobile phone, monitor, TV, projection screen or the like. A data processing procedure, which e.g. converts a Bayer image into an RGB image is often generally referred to in the literature as Image Signal Processing (ISP) pipeline and typically contains one or more of the following processing steps: de-noising, white balance, de-mosaicking, color correction, tone mapping or contrast enhancement and/or sharpening. RGB data obtained after ISP are typically further encoded for compression purpose and then stored on the camera side or transmitted to an external network.

Usually, a raw Bayer image of a scene differs greatly from a corresponding RGB image of the same scene by its statistical and visual quality. The main differences between a Bayer image and an RGB image of the same scene include: impulse-like noise due to sensor defects (called dead pixels), noise component with high amplitude caused by semi-conductor properties, illumination source dependent colors, sensor specific colors (looks unnatural to human), usage of Bayer pattern leads to situation when only one color is known for each point in image space but all 3 basic color (RGB) values are required, low data contrast (especially in dark regions). These issues are usually resolved by the different specific processing steps implemented in the ISP pipeline, as already mentioned above.

SUMMARY

The present disclosure relates to methods and apparatuses for processing of video images.

The disclosure is defined by the scope of independent claims. Some of the advantageous embodiments are provided in the dependent claims.

In particular, pre-processing of video images is performed separately for groups of regions of the video images corresponding to the same object. In other words, the present disclosure relates to object-based temporal pre-processing of a group of video images (frames).

According to an aspect, a method for processing frames of a video in raw image format, the method comprising: identifying an object in image regions of at least two respective frames of the video sequence; joint processing of the image regions that contain the identified object by an image processing adapted to the identified object and different from image processing applied to image regions in the at least two respective frames not containing the identified object.

Provision of the joint processing for regions pertaining to the same object which is different from the processing pf another objects enables individual and adaptive processing of various different objects, which may improve the quality of the image in such regions. In particular, since an object is present in a plurality of frames, the processing may enhance the object image based on the information gathered from the plurality of frames.

According to an embodiment, the joint image processing includes de-noising with a filter of which at least one parameter is determined based on the identified object in the at least two frames. De-noising of the regions may be parametrized based on the object specific features and/or capturing conditions. This enables for content adaptive image enhancement.

In an exemplary implementation, the step of identifying the object comprises: detecting a location of the object within the two or more frames by distinguishing the object from other parts of the frames, and recognizing identity of the detected object in the two or more frames.

For example, the step of recognizing the identity of the detected object comprises: computing of feature vectors for a plurality of image regions in the two or more frames, wherein computing of a feature vector includes determining a value of at least one feature of the corresponding image region, and forming a cluster based on the computed feature vectors, the cluster includes image regions of the respective two or more frames, the image regions including the object with the same recognized identity.

Clustering based on feature vectors enables for efficient grouping of image regions across the temporal domain which relate to the same object. Accordingly, the group-based processing may be performed for each cluster separately and possibly individually, e.g. with the processing pipeline adapted on the features of the cluster images.

In particular, the forming of a cluster is performed by K-means approach, and/or the forming of a cluster is based on determining similarity of feature vectors calculated for the image regions in different frames among the two or more frames, wherein the similarity measure employed is one of Euclidean distance, Chebyshev distance or cosine similarity.

In an exemplary implementation, the step of identifying the object further comprises detecting one or more classes of the object, and in the recognizing of the identity of the detected object, the selection of one or more features of which the values are included in the feature vector depends on at least one of the detected classes of the object.

Object class recognition may be used to support the following steps of object recognition and joint processing. For example, the identified object class may be used to select or parametrize a particular object recognition algorithm or pre-processing, or the joint temporal object-based processing.

In particular, the detecting of the location and the detecting of the one or more classes of the object is performed by YOLO, mobileNet, SSD, SSH or MTCNN face detection, and/or the detected location of the object is a location of a bounding box framing the object or a pixel map. These object detection approaches are readily available and may thus be rapidly incorporated into the methods and apparatuses of the present disclosure.

In order to enable further improvement, the at least two frames of the video in raw image format are pre-processed before the detecting of the object by a first image signal processing, and/or the al least two frames of the video in raw format are pre-processed before the recognizing of the object by means of a second image processing.

Pre-processing applied before the image detection and image recognition may improve the performance of the detection and/or recognition by applying them to an enhanced image. Moreover, specific adaption to the detection and/or recognition task may be performed.

For instance, the second image processing of the image regions including the detected object before the step of recognizing the type of the detected object, wherein the second processing of the detected object includes at least one of the following: filtering with a filter adapted to the type of the detected object, and filtering with a filter of which parameters are set according to the size of the detected object.

In particular, the method may further include obtaining the at least two frames from an image sensor. Moreover the first image processing of the obtained at least two frames is applied, by at least one of the following processing steps prior to the identifying of the object: defect pixel correction, white balance, de-noising, demosaicing, color space correction, color enhancement, contrast enhancement, sharpening, and color transformation.

All or any of the mentioned image processing stages may be applied as an image processing pipeline in order to enhance the image before the detection/recognition. For example, de-noising, contrast enhancement, and color space correction may be advantageous for the object detection (image-based) and recognition (object based).

In one exemplary implementation, the raw image format is Bayer pattern and said pre-processing of the obtained at least two frames includes conversion of the two or more frames into an RGB image format. This combination represents a typical scenario, as most currently used sensors apply Bayer pattern and the further current encoding and/or processing algorithms work with the RGB color space.

The at least two frames are: temporally adjacent frames, or more than two frames equally spaced in the time domain.

According to an aspect, a method is provided for encoding video, including: the method for processing frames of the video in raw image format as described above; and encoding the processed frames of the video by applying lossy and/or lossless compression. The joint pre-processing is particularly advantageous in connection with the following video encoding, leading to the improved perceived image/video quality.

According to an aspect, a computer program is provided, which, when executed on one or more processors, causes the one or more processors to execute the steps of the method as mentioned above.

According to an aspect, an apparatus is provided for processing frames of the video in raw image format, the apparatus comprising processing circuitry configured to perform steps according to any of the above-mentioned methods.

According to an aspect, an apparatus is provided for processing frames of the video in raw image format, the apparatus comprising: object identification module (210) configured to identify an object in image regions of at least two respective frames of the video sequence; and an object-based temporally joint processing module (230) configured to jointly process of the image regions that contain the identified object by an image processing adapted to the identified object and different from image processing applied to image regions in the at least two respective frames not containing the identified object.

For example, the apparatus further comprises image sensor for capturing the video in raw image format.

Any of the above mentioned embodiments and exemplary implementations may be combined.

BRIEF DESCRIPTION OF THE DRAWINGS

In the following embodiments of the disclosure are described in more detail with reference to the attached figures and drawings, in which.

DETAILED DESCRIPTION

In the following description, reference is made to the accompanying FIGS., which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the FIGS. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the FIGS. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the FIGS. Further, it is understood that the features of the various exemplary embodiments and/or aspects described herein may be combined with each other, unless specifically noted otherwise.

Figure 1:
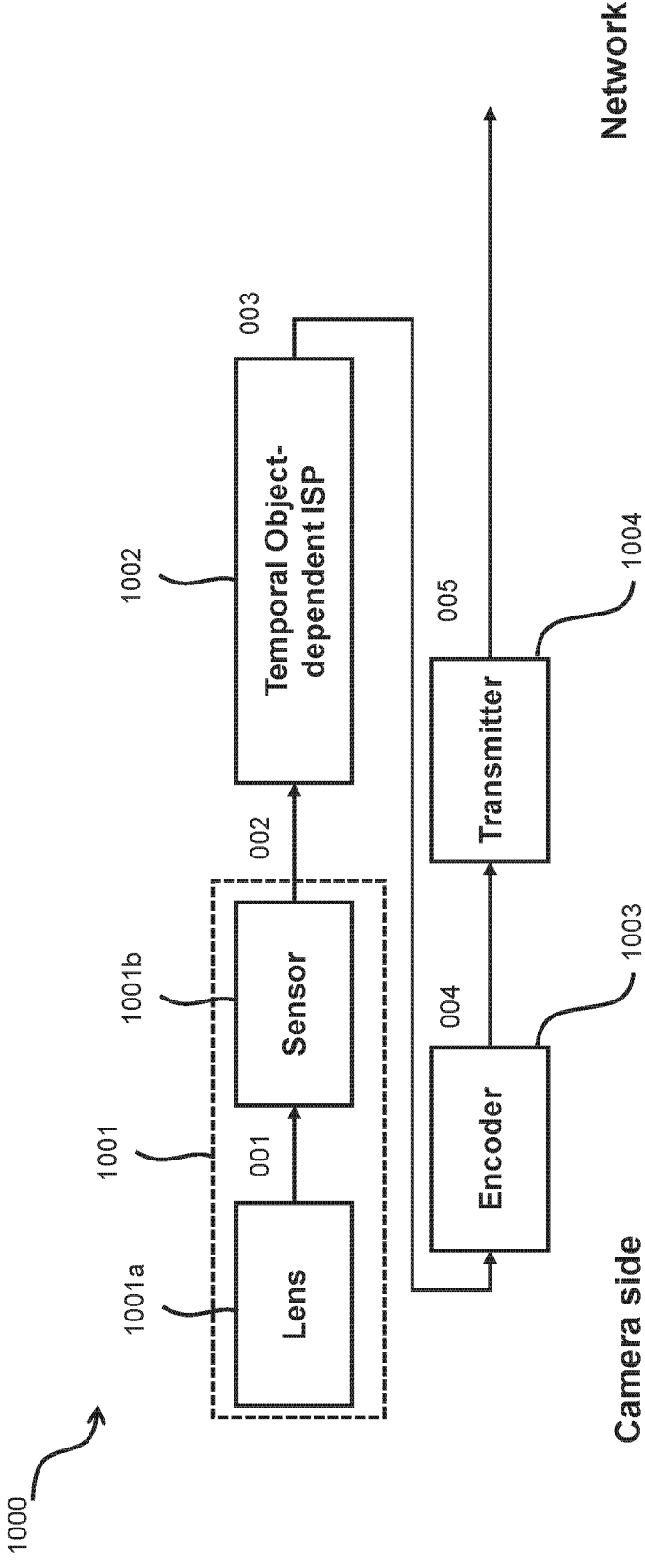
FIG. 1 is a block diagram of an exemplary camera side processing including temporal object dependent signal processing.

FIG. 1 illustrates an embodiment including processing blocks on the camera side 1000. An image capturing device 1001 may include optics (such as one lens or a system of lenses, and/or shutter) 1001*a* for focusing light towards the sensor 1001*b*. Correspondingly, focused light beam 001 is light reflected from the scene to be captured and input to the image sensor 1001*b*. The particular type of sensor 1001*b* and/or optics 1001*a* are not limiting for the present disclosure, as the embodiments of the disclosure mostly relate to image signal processing 1002 following the image capturing 1001. The sensor 1001*b* outputs a sequence of frames 002, which are captured at specific time instances. In other words, the sensor 1001*b* captures frames t–N, t–N+1, . . . , t–1, t in raw format, t being a current time instant at which a frame is captured and t–i, with i representing an integer from 1 to N defining time instances at which preceding frames were captured. The integration of the image signal processing 1002 on the camera side is achieved by providing the signal 002 from the sensor 1001*b* as input an input to the ISP block 1002. The signal 002 from the sensor 1001*b* in this example is presented in a specific format also known as "raw" or unprocessed and may follow Bayer pattern or another color pattern or capturing technology. According to this format signal from sensor is represented by a 2-dimensional matrix with a size W×H, where W is the width of the matrix and H is the height of the matrix in samples. Here, one sample corresponds to a signal captured by one pixel. For example, each element of this matrix represents a measure of light with little or no wavelength specificity. It means each of this elements measure light in specific wavelength range, where different wavelength ranges represents different primary colors, such as red, green, blue and others. Different wavelength ranges are assigned to different pixels using a mosaic pattern, which is another name for the above-mentioned color filter array (CFA). Various different CFA patterns can be used for the present disclosure and its implementations, for example the Bayer pattern.

Embodiments of the present disclosure are concerned with processing 1002 signal 002 from the sensor 1001*b* to provide good quality image which is represented by 3-dimensional matrix W×H×C, where W is the width of matrix, H is the height of matrix, and C is the number of color planes (also referred to as channels, color channels, or color components) in the applied color space. Color space can be but is not limited to following: RGB, YUV or CMYK. The image signal processing 1002 in the present disclosure is a temporal object-dependent ISP as will be explained in detail below. This ISP 1002 outputs a sequence of frames 003. In an exemplary implementation, the frame rate of the ISP-processed frames 003 is the same as the rate of the source 1001, resulting in frames at time points t–N, t–N+1, . . . , t–1, t in a specific color space format: RGB, YUV or else. However, other implementations are possible in which the frame rate of the signal 003 is higher (e.g. achieved by interpolation) or lower (e.g. achieved by temporal down-sampling).

The ISP 1002 may be generally referred to as pre-processing unit. The pre-processing unit receives the (raw) picture data 002 and performs pre-processing on the picture data 002 to obtain a pre-processed picture or pre-processed picture data 003. The term "raw" herein means uncompressed data, e.g. data obtained from the source. It does not necessarily imply mosaicked data. Some technologies do not apply color filters and the present disclosure is not limited to the specific de-mosaicking processing, but may include other types of processing as will be exemplified below with reference to FIG. 4.

The output signal 004 from the ISP 1002 can be stored or transmitted. However, in some applications, reduction of the data size for storing the signal 004 is desirable. Accordingly, the output signal 004 can be further encoded by applying lossless and/or lossy compression, resulting in an encoded bitstream 004. In other words, the encoder 1003 (e.g. video encoder) is configured to receive the pre-processed picture data 003 and provide encoded picture data 004. Video encoding typically refers to the processing of a sequence of pictures, which form the video or video sequence. Instead of the term "picture" the term "frame" or "image" may be used as synonyms in the field of video coding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

This bitstream 004 may be stored or transmitted, via an interface 1004. In order to transmit the bitstream, the bitstream is typically further packetized following one or more protocol layers, depending on the network used for the transmission. Packetization of the bitstream by the interface (transmitter) 1004 results in a network signal 005.

FIG. 1 is an exemplary camera side arrangement 1000. This arrangement may be integrated within a housing and form a camera device with integrated pre-processing, encoding and communication interface. However, the present disclosure is not limited to such arrangement. In general, the camera side 1000 may include two or more separate devices, e.g. separate devices for one or more of the functional blocks 1001 to 1004. In the following description, the term "plurality" also refers to two or more.

Some well-known pre-processing approaches use some trivial statistic to determine its appropriate parameters and use these parameters to process the whole picture. However, application of the same parameter for the whole picture does not provide adaptiveness to local features which may lead to poor performance. For example, if during contrast enhancement the same parameters are used for processing of bright regions as for processing of dark regions, then this may result in an over-enhancement, also known as over-exposure or over-brightness.

Application of trivial statistics for parameter selection does not consider scene semantic, i.e. that a scene is mostly represented by a set of different objects. Therefore, it is a very limited approach. In order to achieve better ISP performance, some embodiments of the present disclosure consider scene semantic and use specific parameters for different objects or groups of objects. In particular, new advanced methods of computer vision analysis are applied to evaluate parameters of some ISP processing steps. Usage of computer vision analytic results is subject of some embodiments to provide temporal object dependent ISP processing for input video at the camera side.

Figure 2:
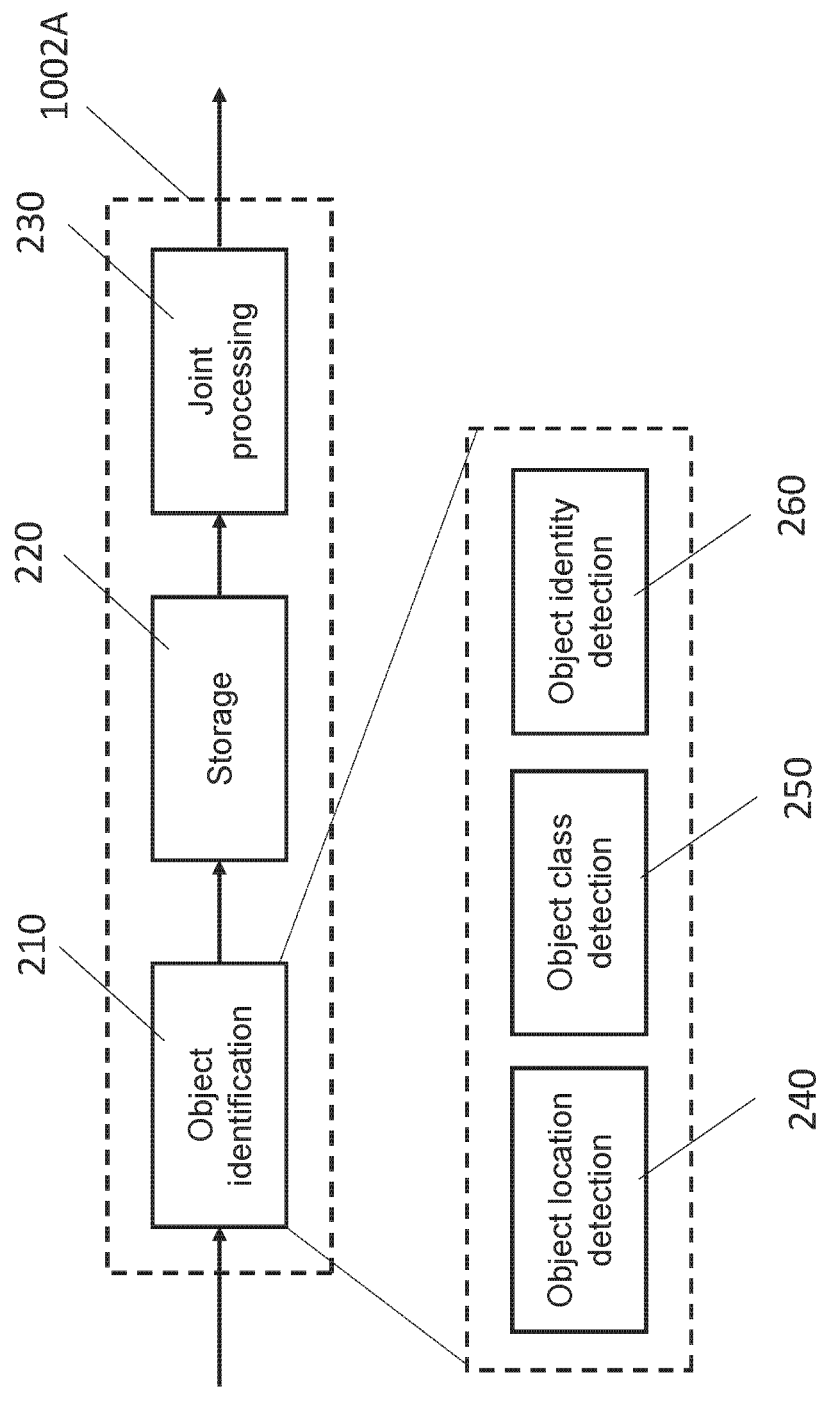
FIG. 2 is a block diagram illustrating exemplary functional blocks of the temporal object dependent signal processing.

FIG. 2 shows a temporal object-dependent ISP unit 1002A which is an exemplary functional structure of the ISP 1002 unit in FIG. 1. Input to the ISP unit 1002A are frames of a video in raw image format. Output to the ISP 1002A are pre-processed frames of the video in the same or different format. The ISP unit may be embodied by one or more processors configured by a software to perform the functional features of subunits 210, 220, and 230. The term processor here refers to any processing circuitry which may be a general-purpose hardware (such as general purpose-processors) with the appropriate software, specialized hardware (such as digital signal processors with specific instructions sets e.g. for image processing) with the appropriate software, programmable hardware (such as FPGA) or specialized hardware (such as ASIC), or a combination of these. The implementation of such processing circuitry may be on a chip which may be specific for the ISP 1002 or may be shared with further functionalities of the camera side such as the encoding and/or storage/network interface.

The ISP 1002A includes a functional object identification unit 210 for identifying an object in image regions of at least two respective frames of the video sequence. Then a joint processing unit 230 performs joint processing of the image regions that contain the identified object by an image processing adapted to the identified object and different from image processing applied to image regions in the at least two respective frames not containing the identified object.

In other words, in each of the plurality of frames of the video sequence, the object is identified. In different frames, the object may be represented differently, i.e. may be slightly transformed (translated, rotated, zoomed in or out, or the like), partly occluded, experiencing a different light condition during capturing, etc. The identified objects as well as the two or more frames may be stored in a storage 220. This storage may be a buffer internal or external to the processing circuitry, i.e. a memory module. The joint processing unit 230 may then fetch the data from the storage 220 and perform the joint processing. The joint processing processes image regions including the same object in the plurality of frames in a similar way and differently from processing of other image regions. Such joint processing may involve adaption of the processing by common determination of parameters for filtering, and then filtering of the image regions including the same object in the plurality of images using a filter with the determined parameters.

The term "object" refers to an object of a scene captured by the two or more frames and present in the captured two or more frames within certain image region (part of the frame). Typical objects may include people, things such as cars, trees, buildings, animals, or the like, background, etc.

The at least two frames of the video sequence may be successive frames. In general, however, the present disclosure may also operate properly when only a subset of the frames (e.g. every second or every third, etc., or a different pattern) are used. The location of the object in the remaining frames may be derived from the location of the object in the frames of the subset, e.g. interpolated.

An aim of the ISP 1002 is image quality improvement. Thus, in an exemplary implementation, the joint image processing includes de-noising with an (adaptive) filter of which at least one parameter is determined based on the identified object in the image regions of the at least two frames.

The term "de-noising" refers to reduction of noise in the image. The filter may be a linear filter or a non-linear filter. Moreover, the order of the filter and/or the filtering function may be determined in an object based manner. It is further noted that the processing is not limited to filtering. De-noising is only one of possible image enhancements which may be performed on the image. Further ISP modules will be described below in more detail.

The object identification 210 may include detecting a location of the object within the two or more frames by distinguishing the object from other parts of the frames, and recognizing identity of the detected object in the two or more frames. In FIG. 2, an object location detection unit 240 implements the functionality of detecting the location of the object.

The object location may be defined in various manners. For example, the object may be detected to be located within a so-called bounding box. A bounding box is a rectangle, which includes the object possibly completely. It is advantageous but not limiting, if the bounding box is as small as possible while including the entire object. A bounding box representation has the advantage that such box can be defined (and thus stored) by only 4 numbers: coordinates (x, y), within the image, of the top left corner and of the bottom right corner. Other variants are possible such as defining the bounding box by the other two diagonal corners (top right and bottom left), or by one corner and size of the rectangle in two directions (x, y), or by a center and a half of the size in the two directions, or the like. Alternatively, to the bounding box representation, the location of the object may be detected and stored more precisely by describing position of all pixels in the image pertaining to the object. This may be achieved, e.g. by defining the bounding box and a bitmap of the size of the bounding box, which indicates for each pixel whether or not it belongs to the object. Further alternatives and/or modifications are possible, such as defining the bit map on a coarser level than the level of each pixel. In other words, the bitmap may be subsampled in comparison with the resolution of the bounding box image region. Contour or vector graphics may also represent location of objects, which may be applied, e.g. for computer graphics or animations or the like.

The recognizing of the identity of the detected object may be performed by the functional unit 260 shown in FIG. 2. In addition, object class may be determined, e.g. by the object class detection unit 250 of FIG. 2.

The identity of the detected object means that the same object of the captured scheme is detected in the plurality of frames (although its location, form, light may differ among the plurality of frames). For example, a scene may include a plurality of cars (or persons). Each car (or each person) has its own identity. The determination of the identity across the frames may be supported by object classification. For example, object class determination 250 may for certain object location provide an object class such as "car", "human", "animal", "plant", "building", "background", or the like.

Any of the above mentioned object location determination 240, object class detection 250, and object identity determination 260 may be implemented or supported by using artificial intelligence, i.e. using an approach based on machine learning such as neural networks of various architectures, deep learning, or the like. However, the present disclosure is not limited to such non-linear approaches. Rather, feature based analysis may be performed in any other way to identify the object(s).

In a particular exemplary implementation, the step of recognizing 260 the identity of the detected object comprises computing of feature vectors for a plurality of image regions in the two or more frames, wherein computing of a feature vector includes determining a value of at least one feature of the corresponding image region.

The term "feature" here refers to image features such as those typically employed in image detection or recognition, for example low-level features including presence and/or strength of the edges or gradients; presence, absence or similarity with a specific predefined pattern, or the like. Moreover, high-level features may be employed such as class-specific features, for instance for a class "human face", features such as closed eyes or open eyes, color of eyes, pose, etc. may be used. It is noted that features may be any image-based features even without any assigned specific meaning, i.e. calculation performed according to a predefined prescription with a part of image as an output and a value determined based on the part of the image as an input. The term feature vector denotes one (feature vector with only one element) or more features arranged in a predefined order.

The computed features are then used as a basis for forming one or more cluster. A cluster includes image regions of the respective two or more frames. In particular, the image regions of a cluster are to include the object with the same recognized identity across the multiple frames. Clustering generally works by grouping elements with similar features into distinct clusters. For example, the forming of a cluster is based on determining similarity of feature vectors calculated for the image regions in different frames among the two or more frames. The similarity measure employed can be for instance the Euclidean distance, the Chebyshev distance, the cosine similarity, and/or any other metric. Moreover, correlation, sum of absolute differences or sum of squared differences between the elements of the feature vectors may be used in addition or alternatively. It is possible to employ a combination of different metrics.

In one exemplary implementation, the forming of cluster(s) is performed by the K-means approach. In K-means clustering, each element to be clustered (here an object detected in one frame) belongs to the cluster with the nearest mean (cluster centers or cluster centroid), serving as a prototype of the cluster. K-means clustering minimizes within-cluster variances (squared Euclidean distances), but not regular Euclidean distances. Alternatively, k-medians or k-medoids may be applied for clustering. In summary, the present disclosure is not limited to any particular cluster forming.

As mentioned above, the object recognition (identity determination) may be further supported by classifying the object. In such case, the step of identifying the object further comprises detecting one or more classes of the object. In the recognizing of the identity of the detected object, the selection of one or more features of which the values are included in the feature vector may depend on at least one of the detected classes of the object. In this way, the feature vector may be adapted to the object it should characterize and the complexity of the clustering may be reduced and performed more accurately.

There are several approaches and tools available for performing object detection and classification. For example, the detecting of the location and the detecting of the one or more classes of the object in some embodiments is performed by YOLO, MobileNet, SSD, SSH or MTCNN face detection. In particular, YOLO is a name for the "You Only Look Once" framework. It employs a model based on a convolutional neural network (CNN) that is capable of detecting objects in real time. MobileNet is a computationally efficient CNN architecture by Google designed specifically for mobile devices with very limited computing power. SSD stands for Single Shot Multibox Detector and is also capable to perform object detection and classification based on bounded boxes. SSH stands for Single Stage Headless (SSH) face detector and employs CNN to specifically detect and classify faces. MTCNN stands for Multi-task Cascaded Convolutional Neural Networks also used for object detection. It is noted that any CNN based approach may be employed by the present disclosure. Moreover, different approaches than neural networks or artificial intelligence in general may be employed.

There may be approaches particularly suitable for detecting certain type of objects such as faces. Thus, the present disclosure is not limited to a single model. Rather, it may employ a certain model depending on the deployment of character of images to be processed. For instance, detection and recognition of human faces may be better performed by a network other than the network particularly suitable for identifying cards or other objects.

As mentioned above, the detected location of the object may be a location of a bounding box framing the object or a pixel map.

Figure 3:
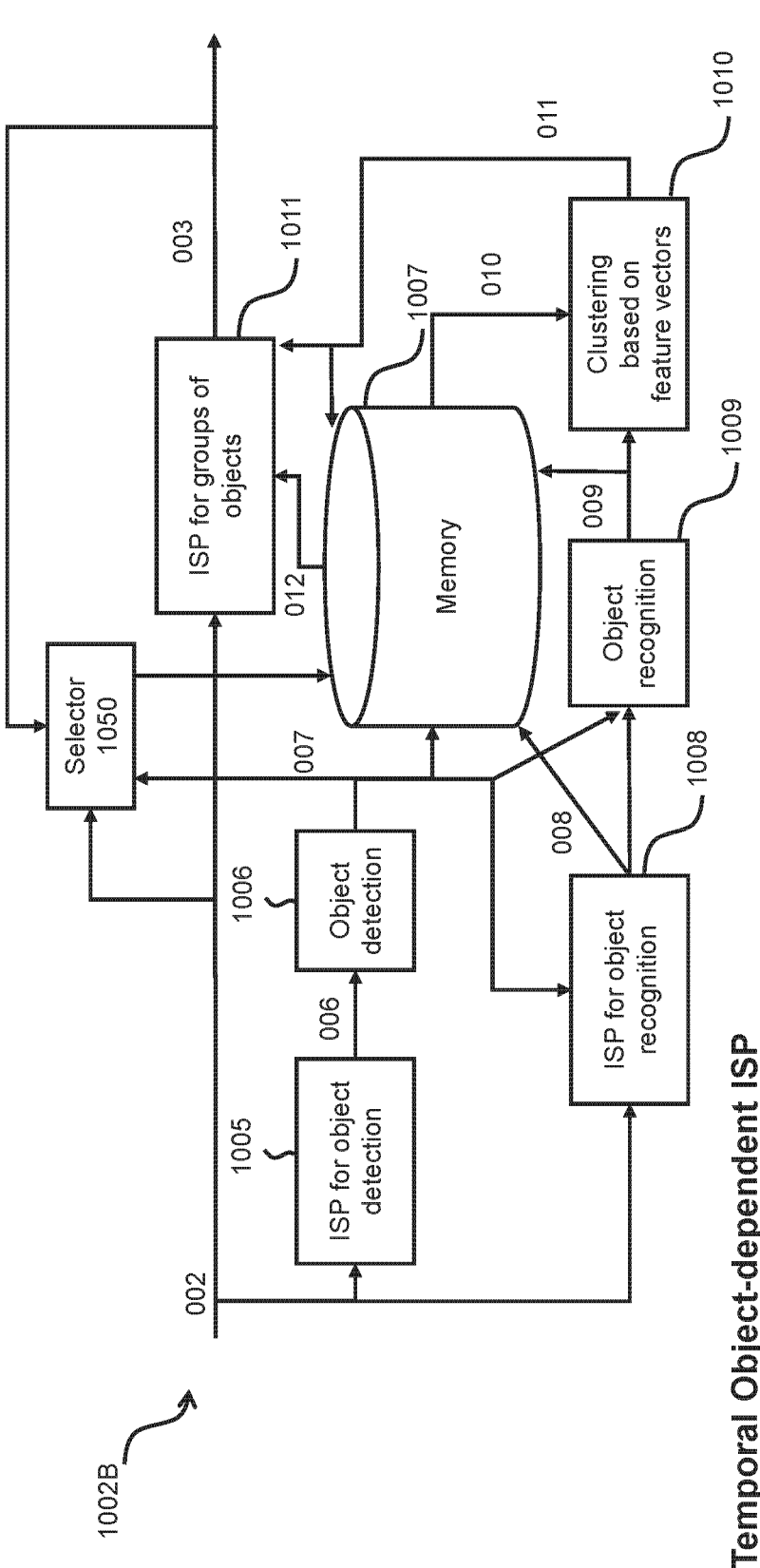
FIG. 3 is a block diagram illustrating further details of exemplary functional blocks of the temporal object dependent signal processing.

In the following, detailed description of the ISP 1002B will be presented with reference to FIG. 3. It is noted that, as mentioned above, not all functions represented by the functional blocks of FIG. 3 are necessary or limiting. Rather, FIG. 3 shows a possible implementation including many specific functions contributing additionally to the quality improvement of the image provided by the disclosure.

FIG. 3 shows a joint object-based ISP module 1011 which corresponds to the joint processing module 230 of FIG. 2. Input of the joint object-based ISP module 1011 is the input image data 002 and its output is the processed data 003. In particular, the input signal 002 is formed by a sequence of frames at time points t–N, t–N+1, . . . , t–1, t in raw format, i.e. in a format provided by a sensor (possibly and optionally also by some pre-processing already performed by the sensor's related circuitry). The output signal 003 is a sequence of frames at time points t–N, t–N+1, . . . , t–1, t in a specific desired color space format, such as RGB, YUV or any other. In this notation, t represents a current time instant and N represents the number of frames which considered and processed jointly. For example, N may be 1, 2 or 3 or any higher value which may be chosen, for instance, depending on the particular application, available computation power, and/or frame rate. With the low values such as 2 or 3, the complexity is lower. However, with some higher values, the performance may improve, depending on the characteristics of the video in the temporal domain.

Memory 1007 corresponds to the memory module 220. The remaining modules relate to performing of the object identification. An object detection module 1006 corresponds to the object location detection module 240 (and, possibly, to object class detection module 250, too), whereas an object recognition module 1009 together with the clustering module 1010 correspond to the object identity detection 260.

For the sake of clarity, in the following the signals referred to in FIG. 3 are briefly summarized:

002—sequence of frames t–N, t–N+1, . . . , t–1, t in raw format,

006—sequence of frames t–N, t–N+1, . . . , t–1, t in YUV or in RGB format,

013—sequence of frames t–N, t–N+1, . . . , t–1, t in Bayer format with corrected defect pixels, 014—sequence of frames t–N, t–N+1, . . . , t–1, t in Bayer format with normalized colors, 015—sequence of frames t–N, t–N+1, . . . , t–1, t in Bayer format with suppressed noise, 016—sequence of frames t–N, t–N+1, . . . , t–1, t in sensor specific RGB format, 017—sequence of frames t–N, t–N+1, . . . , t–1, t in standard RGB format, 018—sequence of frames t–N, t–N+1, . . . , t–1, t in standard RGB format with enhanced contrast, 019—sequence of frames t–N, t–N+1, . . . , t–1, t in standard RGB format with enhanced edges, 007—list of bounding boxes (coordinates of location of objects detected in processed frame) and corresponding class IDs, 008—set of image regions corresponding to detected objects processed by ISP, tuned for object recognition, 009—set of feature vectors (sequence of numbers) calculated for each region corresponding to each detected object, 010—feature vectors, bounding boxes and class id data for N previously processed frames, 011—bounding boxes (block based or pixel-wise) united for the same object in a sequence of frames, and 012—set of images which belong to the same object along current and last N previous frames.

As can be seen in FIG. 3, there are three kinds of ISP: the above-mentioned joint object-based ISP 1011, an ISP for detection module 1005, and an ISP for recognition module 1008. These different ISP modules may have a different aim and thus different settings. However, they may share some similar processing stages, which will be generally described below at first, and then discussed with regard to the respective modules.

Figure 4:
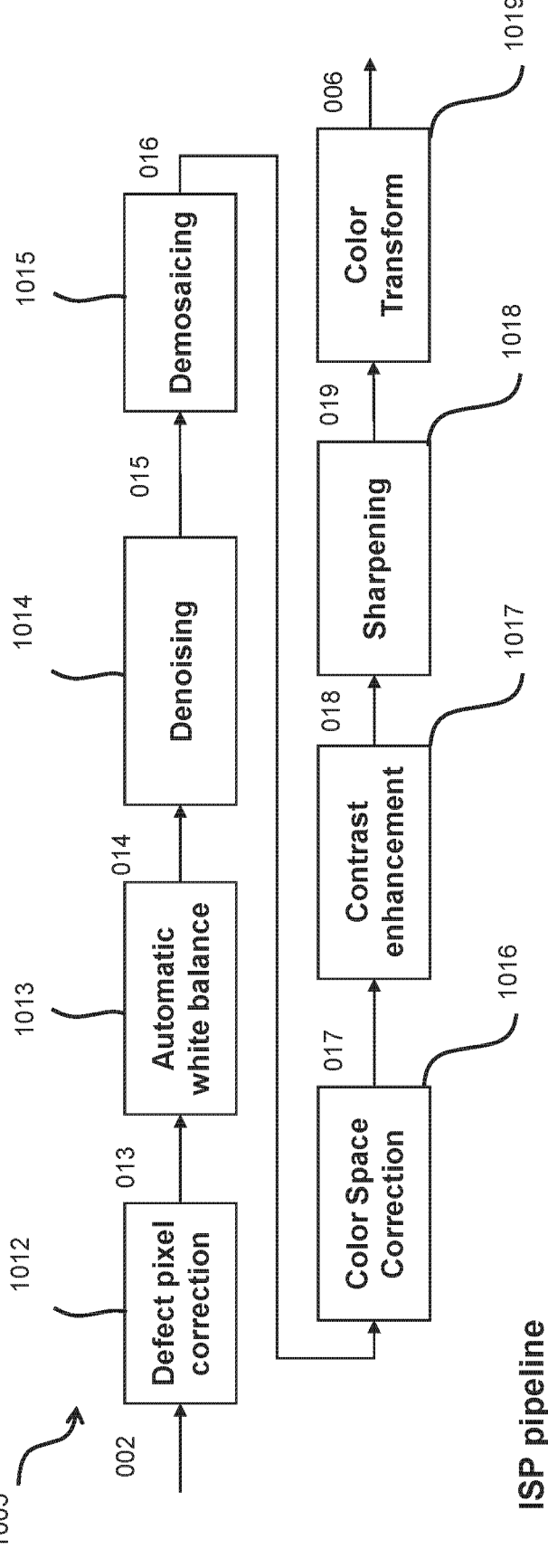
FIG. 4 is a block diagram illustrating stages of image signal processing before object detection.

In general, an ISP module may include one or more (or all) of the following: (1) defect pixel correction, (2) white balance, (3) de-noising, (4) demosaicing, (5) color space correction, (5a) color enhancement, (6) contrast enhancement, (7) sharpening, and (8) color transformation. Employing of these pre-processing methods improves the image 002 received from the sensor for a particular purpose such as object detection, object recognition or image pre-processing or enhancement to improve its perceptual quality. An exemplary structure of an ISP pipeline is depicted in FIG. 4.

In FIG. 3, before the object detection, the signal from sensor 002 (raw video data) is first processed by some specific ISP 1005 (referred to as "ISP for detection") to transform the raw video data into preliminary signal 006. Signal 006 is more suitable for object detection module 1005. This signal 006 could be in the same format as the output pre-processed signal 003, e.g. YUV or RGB or the like. In other words, the at least two frames of the video in raw image format are pre-processed before the detecting of the object by a first image signal processing 1005 referred to as ISP for object detection.

The pre-processing (first image signal processing) 1005 and/or the pre-processing 1008 (second image signal processing) may include one or more (or all) of the following: (1) defect pixel correction, (2) white balance, (3) de-noising, (4) demosaicing, (5) color space correction, (5a) color enhancement, (6) contrast enhancement, (7) sharpening, and (8) color transformation. Employing of these pre-processing methods improves the image 002 received from the sensor for the purpose of the object detection. Consequently, the object detection may be performed with a higher accuracy.

After the pre-processing by the ISP for object detection 1002, as can be seen in FIG. 3, the object detection and object identification are performed in order to identify the same object in a plurality of frames. Then, after the groups (clusters) of the same respective objects have been identified (in modules 1006 to 1010), the joint processing of each such group (cluster) is performed in module 1011.

Regarding terminology, herein, the terms "module" and "unit" are employed interchangeably and refer to a functional processing block which may be implemented by separate circuitry or circuitry shared by other modules. Functional blocks are described by means of function they embody (implement). Accordingly, the term "stage" is also employed herein when referring to the general function (procedure) performed by the respective module/unit. Moreover, the general term "signal" or "image signal" herein refer to signal corresponding to digital data, which represent samples of the image. The term "image" is used interchangeably with the term "frame" or "image frame" or "video frame". At some stages described in the present disclosure, the frames of the video are not necessarily processed jointly (such as the pre-processing ISP 1002) and may be processed frame per frame. Accordingly, the processing may be applied to individual images.

FIG. 4 illustrates all above-mentioned methods (1) to (8). As mentioned above, the image improved by any one or more of these methods is more suitable for object detection, so that the present disclosure is not limited to employing all of them. In fact, depending on the format of the raw data and the particular purpose of the ISP (e.g. modules 1005, 1008, 1011), only a subset of the methods may be applicable or particularly beneficial. For example, performing demosaicing before de-noising can blur the noise over the picture.

Thus, it may be advantageous in some application, to de-noise frames before applying demosaicing. However, in other applications, de-noising after the demosaicing may be acceptable or advantageous. It may be advantageous to apply AWB before color correction.

As mentioned above, in addition or alternatively to the pre-processing for object detection, the at least two frames of the video in raw format are pre-processed before the recognizing of the object by means of a second image processing. In an exemplary embodiment, the second image processing of the image regions including the detected object before the step of recognizing the type of the detected object, wherein the second processing of the detected object includes at least one of the following: filtering with a filter adapted to the type (class) of the detected object, and filtering with a filter of which parameters are set according to the size of the detected object.

(1) Pixel Correction

In FIG. 4, signal 002 from the sensor enters defect pixel correction unit 1012. Defect pixel correction is applied to remove artifacts originating is sensor hardware defects/imperfections. There are two different types of such artifacts:

Dead pixels: These artifacts occur when a sensor cell (pixel) is always registering low illumination even if high illumination level is presented. For example, the digital value obtained by reading out and AD conversion of the pixel in some fixed position of the sensor's signal is equal to zero.

Saturated pixels: These artifacts occur when a sensor cell is always registering high illumination level even in low light conditions. Therefore, a digital value in some fixed position of sensor's signal is equal to maximum possible value, i.e. the pixel is saturated.

Both types of artifacts lead to spatial outliers in the sensor's data, i.e. in the signal 002. A following exemplary procedure can be applied to one or more channels (color components) of the sensor's data according to its CFA for outliers detection and correction:

$$\hat{S}(i,j) =$$

$$\begin{cases} S(i,j+1) + S(i,j-1) + S(i+1,j) + S(i-1,j), \text{ if outlier } (i,j) = \text{ true} \\ S(i,j), \text{ in other case} \end{cases},$$

where $\hat{S}(i, j)$ represents the corrected image data value on the position $(i, j)$. Moreover, $S(i,j)$ is sensor data value from position $(i, j)$ of the same CFA component. In order to correct an image data on the position corresponding to the defect pixel, it is to be decided, which pixels are defect. In other words, outlier(i,j) can be a following indicator function producing a Boolean result (either true or false):

$$\text{outlier}(i,j) =$$

$$\begin{cases} \text{true, if} |S(i,j+1) - S(i,j)| > thr \text{ and if } |S(i,j-1) - S(i,j)| > thr \text{ and} \\ \quad \text{if } |S(i+1,j) - S(i,j)| > thr \text{ and if} |S(i-1,j) - S(i,j)| > thr \\ \text{false, in other case} \end{cases}.$$

In summary, the defect pixel correction unit 1012 obtains from the sensor or detects the defect pixels. The defect pixels can be detected by checking whether or not a pixel is outlier when compared with the surrounding pixels, e.g. for a higher accuracy pixels of the same color channel. In the above-mentioned example, the absolute difference between the tested pixel and the surrounding pixels is compared to a threshold thr. If all differences exceed the threshold, the pixel is identified as an outlier and corrected. However, it is noted that the present disclosure may be also used if not all four (top, bottom, left, right) neighbors are tested. Moreover, to achieve an even stronger indication, further one or more or all of neighboring or adjacent pixels (top-left, bottom-left, top-right, bottom-right) may also be tested.

The correction of an outlier is performed by interpolating the image data corresponding to (on the position of) the defect (saturated or dead) pixel using the neighboring pixels. The number of pixels used to interpolate the defect value is a choice of a tradeoff between the complexity and quality of interpolation. Any one or more of the neighboring or adjacent pixels may be used in context of the present disclosure. It is noted that the above examples of detection and correction of the image data corresponding to the defect pixels may be replaced by any other approach. Moreover, the detection is not necessarily performed for each frame. Hardware defects of sensor pixels typically pertain. Consequently, the detection may be performed once and the result (position of the defect pixels) may be stored so that the data on the positions of the defect pixels is corrected in each frame. In some implementations, the sensor 1001b is provided with some control circuitry which may detect and/or provide the position of the defect pixels as an input to the defect pixel correction unit 1012.

In general, the signal 002 is not necessarily a CFA based mosaicked signal. Other color formats may be delivered directly by the sensor, or the sensor may include some additional circuitry applying some pre-processing (one or more of the methods (1) to (8) mentioned above) already. In FIG. 4, the defect pixel correction unit 1012 outputs image signal 013 with corrected sensor defects. The image signal (image frame) 013 is then passed to the next processing unit 1013 of the ISP pipeline 1002.

It may be advantageous to perform defect pixel correction directly on the signal coming from the sensor, e.g. as a first step in the pipeline, because after the steps including filtering and other adaptions, the detection may become more difficult. The defect pixel correction may be applied for all three ISP modules 1005, 1008, and 1011. In fact, it may be performed once, directly after outputting digital image data from the sensor and before inputting the data to the three respective ISP modules. Defect pixel correction improves not only perceptual quality of the image for the user, but also reduces noise for object detection and recognition. However, the present disclosure is not limited to common employment of a defect pixel correction. The defect pixel correction module 1012 may be part of each of the three modules. It may be advantageous for some implementations to provide the same general ISP pipeline which merely apply different parameters in some of their stages. Other configurations are possible, such as employing the defect pixel detection only in a subset of the three ISP modules.

(2) Automatic White Balance (AWB)

The automatic white-balance 1013 is applied to the image signal corrected by unit 1012 in FIG. 4. However, in general, the AWB may be applied directly to the sensor data or after some other processing steps. In other words, the order of the processing stages ((1) to (8)) in the ISP pipe 1002 may be changed.

The AWB is an algorithm of color correction according to human perception. Automatic white balance algorithm based on gray world hypothesis (Van De Weijer, Joost, and Theo Gevers. "Color constancy based on the grey-edge hypothesis." IEEE International Conference on In Image Processing, 2005. ICIP 2005, pp. II-722) can be used for this purpose in the ISP pipeline 1002. This algorithm calculates mean brightness for each CFA color component in the sensor raw data and uses linear scaling to provide same mean brightness for each CFA color component color. Alternatively, the white balance adjustment procedure 1013 can be done using scaling coefficients which were prepared by humans specifically for the used sensor.

The AWB unit 1013 outputs the image signal 014. The AWB may improve the human-perceived image quality. Accordingly, it may be beneficial to employ the AWB stage in the ISP for joint object-based processing 1011. The AWB stage 1013 may also be employed in one of or both ISP modules for object detection and recognition or may be employed commonly before the specific ISP modules.

(3) De-Noising

In FIG. 4, the signal 014 is further processed by a de-noising unit 1014, which performs the de-noising procedure. As mentioned above, in general, the de-noising may be also performed at another position within the pipeline or does not have to be performed at all. The de-noising may improve the image quality for the object detection, as it reduces the noise in the image so that the likelihood of correct detection may increase. Similarly, de-noising may be useful for object recognition. The joint object-based ISP may also employ de-noising with the aim of improving the perceptual image quality. Accordingly, the implementation of the de-noising for the three respective ISP modules may differ to meet their specific requirements.

In general, the de-noising is a procedure for suppression of artifacts occurring due to imperfection of hardware procedures for light measurements by the sensor. Such artifacts may be represented by non-correlated measured light value fluctuations, for instance some shot noise caused by imperfection of the corresponding pixel photo detectors. To suppress such artifacts, any of the known de-noising approaches can be applied to the image data from the sensor (and possibly already processed by one or more preceding ISP pipe 1002 stage(s)). If a CFA is applied by the sensor, the de-noising may be applied for each CFA component separately, or at least for some of the components. Among the approaches which may be applied are, for instance: Gaussian filter, bilateral filter, guided filter (K. He, J. Sun and X. Tang, "Guided Image Filtering," in IEEE Transactions on Pattern Analysis and Machine Intelligence, vol. 35, no. 6, pp. 1397-1409, June 2013. doi: 10.1109/TPAMI.2012.213), Non-Local Mean (NLM, e.g. such as in Buades, Antoni (20-25 Jun. 2005). "A non-local algorithm for image denoising." Computer Vision and Pattern Recognition, 2005. 2. pp. 60) or other approaches.

Default parameters of the de-noiser are usually obtained as some function of noise measure $\hat{\sigma}^2_{noise}$. For example, the following formula shows an example on how a filter kernel size (which impacts filtering strength—the larger the size, the stronger the filtering) may depend on the noise measure:

$$kernel\_size = round\left(a * \hat{\sigma}^2_{noise} + b\right),$$

where a and b are constant values specified by user. However, the present disclosure is not limited thereto. Alternatively or in addition, the kernel size and/or filter coefficients may depend on further parameters such as estimate of illumination or features of the noise and the filtered image or the like.

Signal variance estimation $$\sigma^2_{signal}$$

could be used as an example of such noise measure:

$$\hat{\sigma}^2_{noise} = \sigma^2_{signal} = \frac{\sum_{i=1}^{N}(s_i - \bar{s})^2}{N-1},$$

where $s_i$ is an i-th sample of the signal and $\bar{s}$ is the mean value of the signal. N is the number of signal samples used by the variance estimator.

In a general de-noising described above, default de-noising parameters are typically used to provide perceptually pleasing image with objects and their details. This may be useful when implemented in the joint object-based ISP processing module 1011. However, for the particular application of object detection, such default parameters may not be very suitable. In order to improve the performance of the object detection, they may be changed to increase power of the de-noiser. Such tuning is explained by the fact that for object detection details of the objects are usually not as important as its shape. Such de-noising can be implemented by increasing the noise measure from the above mentioned $\hat{\sigma}_{noise}$ to $\hat{\sigma}_{noise\_inc}$ for example in a following way:

$$\hat{\sigma}_{noise\_inc} = c_{dn\_det} * \hat{\sigma}_{noise},$$

where $c_{dn\_det}$ is some predefined constant, preferably larger than 1. The sign "*" here refers to scalar multiplication.

The denoising for the object recognition may, in general, also apply the constant $c_{dn\_det}$ in order to emphasize the shape features, or de-emphasize the small-scale patterns. It is even possible to re-use the de-noised image generated for the purpose of the object detection.

In order to, alternatively or in addition, improve the de-noising for object recognition task, de-noising for object recognition may support usage of different de-noiser parameters for different regions depending on their size. According to an exemplary implementation, a stronger de-noising is applied for large regions (i.e. regions including the detected objects such as bound boxes and/or bitmaps) because they are associated with larger objects, and more delicate de-noising for small regions. In other words, filtering of a first object region is stronger than filtering of a second object region, if the first region is larger than the second region. The term "larger" here refers to some predefined measure such as number of samples. However, the size may be also measured by vertical and horizontal size of the bound box, or in any other manner. When referring to "stronger" or "weaker" filtering, what is meant is e.g. amount of smoothing or low pass filtering, or in general amount of change applied to the filtered image samples, or amount of correlation increased due to filtering between the adjacent samples.

An exemplary de-noising for object recognition may be implemented by the following noise measure modification:

$$\hat{\sigma}_{noise} = c_{dn\_rec} * w_{bbx} * h_{bbx} * \hat{\sigma}_{noise},$$

where $c_{dn\_rec}$, is a predetermined constant, which may be similar as $c_{dn\_det}$ mentioned above with reference to the object detection. Moreover, parameters $w_{bbx}$, $h_{bbx}$ are respectively width and height of the object region. As mentioned above, instead of $w_{bbx}$, $h_{bbx}$ and $w_{bbx}$, $h_{bbx}$ a single parameter $v_{bbx}$ or $v_{obj}$ may be used, indicating the volume in number of samples of the bounding box (bbx) or the detected object (obj) within the bounding box.

In general, the de-noising function (or the amount of filtering) may be a function of estimated noise, which is determined and modified (e.g. increased) in dependency of the height and/or the width of the object region or on the number of samples in the object region (e.g. bounding box) or the number of samples of the object (within the bounding box).

In addition or alternatively to the dependency of the noise estimation modification according to the object (region) size, the de-noiser function may depend on the class of the detected object. In particular, the de-noiser (filter) parameters may depend on the class of the detected object. An approach which may be applied therefor can be found, e.g., in T. Remez, O. Litany, R. Giryes and A. M. Bronstein, "Deep class-aware image de-noising," 2017 International Conference on Sampling Theory and Applications (SampTA), Tallin, 2017, pp. 138-142. doi: 10.1109/SAMPTA.2017.8024474. in general, the class-dependent de-noising may be depend on the application. For example, for autonomous vehicle driving, details of the road signs and edges around pedestrian figures are of interest, but details of persons' faces are unimportant. Therefore, using weaker filtering for road signs and moderate filtering for pedestrians may be a good choice. On the other hand, when monitoring persons, e.g. at the airports, the persons' faces may be of more interest than the surrounding, possibly resulting in different filter settings.

However, this are only examples and, in general, any other approach is also applicable.

In summary, de-noising for object recognition may be implemented as a filtering of which parameters depend on at least one of the:

height and/or width of the bounding box in which the detected object can be found, size of the bounding box in terms of number of samples, size of the object in the bounding box in terms of number of pixels, class of the object.

The de-noising unit 1014 processes input signal 014 and outputs processed signal 015.

(4) Demosaicing

Demosaicing is an approach for transferring data from the sensor's raw format after application of CFA by the sensor to a colorful image, i.e. an image including two or more color component images (e.g. three R, G, B images).

In the ISP pipeline 1002, this is performed by the demosaicing unit 1015. In other words, the demosaicing unit has, as an input 015, color samples corresponding to the applied CFA (possibly after application of one or more other processing stages, e.g. one or more of stages (1)-(3) or (5) to (8), and/or further pre-processing steps). The ISP pipeline outputs image data 016, which correspond to color samples of the desired color space, such as RGB. For example, the output image data may comprise three color component images (such as red, blue and green) with the same number and location of samples per each color component image.

As an example, one of the following known algorithms can be used for demosaicing module (unit) 1015 implementation: bilinear demosaicing, AHD (K. Hirakawa and T. W.

Parks, "Adaptive homogeneity-directed demosaicing algorithm," in IEEE Transactions on Image Processing, vol. 14, no. 3, pp. 360-369, March 2005. DOI: 10.1109/TIP.2004.838691), or DDFAPD (Menon, Daniele & Andriani, Stefano & Calvagno, Giancarlo. (2007). Demosaicing With Directional Filtering and a posteriori Decision. IEEE transactions on image processing: a publication of the IEEE Signal Processing Society. 16. 132-41. 10.1109/TIP.2006.884928). However, the disclosure is not limited to the above-mentioned approaches, and any other demosaicing may be applied. In principle, in the most CFAa, the amount of red pixels and the amount of blue pixels are smaller than the amount of green pixels. Thus, a demosaicing may be performed by any interpolation (estimation) approach, which derives the image signal for the blue and red pixels on the positions of the green pixel position in surplus.

Demosaicing may be useful for all three ISP modules 1005, 1008, and 1011, as it converts the CFA cased data into a format usually used for further processing such as object detection or recognition and/or for image displaying or compressing. Thus, it may be performed once, in the same way for all the three modules or separately in each or a subset of the three modules.

(5) Color Space Correction

Color Space Correction (CSC) is a procedure to transform signal from a specific color space to one of the color spaces defined by a known standard such as Adobe RGB or sRGB or to any other color space. The specific color space of the input signal is typically a color space of the sensor.

In FIG. 4, the CSC module (unit) 1016 is input an image signal 016. The image signal 016 is, for instance, an image (video frame) with three RGB component images. The CSC procedure is usually performed by multiplication of each pixel (which is represented by a color vector of length 3 in case of three color components) by a color correction matrix with size 3×3. Coefficients of this color correction matrix are typically obtained for a sensor beforehand, e.g. in a laboratory, and then stored in the camera memory, e.g. in a memory which may be associated with the sensor 1001*b*. Turning back to FIG. 1, it is noted that the image capturing device 1001 may include some sensor-related circuitry apart from the AD converter, such as memory and some control circuitry as mentioned above. The coefficients applied in color space transformation may be obtained in the laboratory using color chart based automatic evaluation algorithms or manually defined by one of the respective engineers.

In case the RGB format is the desired format for further processing (e.g. object detection) and the colors delivered by the sensor are acceptable, then further CSC 1016 may be omitted for some or all ISP pipelines 1005, 1008, and 1011, or performed in a different manner.

To provide a particular implementation example, demosaicing and/or Color Space Correction for the purpose of ISP tuning for the object detection may include any known demosaicing algorithm to get an RGB image. Then averaging procedure can be applied for each pixel to calculate average between red, green and blue values in each spatial coordinate to get greyscale picture and suppress colors. Color suppression leads to further removal of such color processing modules like auto white balance and color correction which become obsolete. Color processing removal may not only decrease the scheme complexity but may actually improve detection performance because object colors are rarely needed for the detector (detector is trained to identify objects in different illumination environment therefore it is color invariant) and at the same time the color noise which severely decreases object detection performance may be suppressed in greyscale image.

There are many possible implementations. The ISP for object detection 1005 and/or the ISP for object recognition 1008 may be tuned specifically for object detection rather than for obtaining processed image to be output to the user. This may be achieved by working in a gray-scale space rather than in a color space. Still, the ISP for joint object-based processing 1011 may employ the color processing in order to process all color channels aiming at improvement of the perceived image quality. After the CSC, CSC-corrected signal 017 is output to the next processing stage of the pipeline 1002.

(6) Contrast Enhancement

Contrast enhancement is a term referring to various different approaches for brightness and contrast enhancement in images (video frames).

FIG. 4 shows a contrast enhancement module 1016. The contrast enhancement module 1016 has as an input an image (video frame), possibly but not necessarily already processed by one or more previous ISP pipeline stages, such as modules 1012 to 1015, 1017 or 1018 shown in FIG. 4. The contrast enhancement module 1016 outputs the processed image signal 017 which may have the same format as the input signal 016 but enhanced image features such as contrast and/or brightness.

This module 1016 can be implemented using one of the known methods, for example one of the following state-of-the-art methods: gamma transform (also known as gamma compression), histogram equalization (R. C. Gonzalez and P. Wints, Digital Image Processing, 2nd Ed., Addison-Wesley Publishing Co., Reading, Massachusetts, 1987).

The output signal 017 may be passed to the next processing stage (module) of the pipeline 1002.

The contrast enhancement may be applied according to the state of the art for improving perceptual quality of the jointly processes image (module 1011).

For the purpose of the object detection, the contrast enhancement may be applied in an object based manner, i.e. differ for different objects and, in particular, depending on their size and/or class. Moreover, an exemplary implementation may apply only locally adaptive contrast enhancement instead of globally adaptive contras enhancement. Moreover, the local and global contrast enhancement procedures may be combined. Local adaptive methods provide stronger contrast enhancement but usually they are not used in state-of-the-art ISP because they can decrease perceptual quality by providing enhancement discontinuity around objects also known as halo-like artifacts. However, for the purpose of the object recognition, the enhancement does not need to be perceptually pleasing and the artifacts do not jeopardize the object recognition. Thus, one of the known local contrast enhancement approaches such as Contrast Limited Adaptive Histogram Equalization (CLAHE) in the above-mentioned reference by R. C. Gonzalez and P. Wints may be applied.

(7) Sharpening

FIG. 4 shows a sharpening module (unit) 1017. Sharpening is a procedure for enhancement of details by amplification of high frequency spectrum of the processing signal. Un-sharp mask has been the most widely used approach for sharpening, and can be implemented using any known approaches, such as the following methods: difference of Gaussian or Laplacian filter, both mentioned for instance in the above-mentioned paper by R. C Gonzales and P. Wints.

The sharpening may also improve object detection and recognition, as it emphasized the edge features, which are typically also used in object detection and recognition. However, as mentioned above, sharpening module 1017 is optional for the ISP pipeline 1002. Since sharpening may enhance also the quality of the image, it can be employed by the joint object-cased ISP 1011.

(8) Color Transformation

Color transformation (or briefly "color transform") is a procedure for image transformation from one color space to another. Typical color spaces are the following: RGB, YUV and CMYK. Color transformation can be implemented according to any of following exemplary standards: ITU-R.BT709, ITU-R.BT601 and ITU-R.BT2020 or according to any other rule.

FIG. 4 shows the corresponding color transform module 1018 which takes as an input signal 018 (image signal) and outputs the image signal 006.

It is noted that the color space correction 1016 and color transformation 1019 herein have different purposes: the CSC 1016 corrects colors output by the sensor. The color transformation transforms the color space used in the pre-processing to a color space required by the following processing (e.g. object detection) or selected by the user as the desired output format after the module 1011. However, these two stages may also be performed at one stage, or the CSC may already transform the colors into the desired color format (e.g. by using a single transformation matrix combining effects to the CSC and the color transformation) so that further color space transformation 1019 is not necessary. Moreover, the demosaicing may also already provide the desired space such as YUV or RGB or the like.

The above mentioned ISP processing stages may be combined. In image processing using available typically used technology, an exemplary implementation may be useful, in which the raw image format is Bayer pattern and said pre-processing of the obtained at least two frames includes conversion of the two or more frames into an RGB image format. In other words, the sensor produces Bayer-pattern following samples. The ISP pipeline (the joint ISP and/or the ISPs for object detection and/or recognition) provides an RGB output. In addition, application of de-noising before or after the conversion into the RGB may be beneficial.

Object Detection

As described above with reference to FIGS. 2 and 3, object detection (240; 1006) aims at detecting location of the objects in an image and possibly determine class of the objects. Even though the term "objects" is employed herewith in plural, it is clear that an image may also have only one object and that the present disclosure covers and is applicable to a single object as well as to a plurality of objects.

The object detection module 1006 may be input the signal 006, which is preprocessed by an ISP for object detection module 1005 as described above. In particular, for the purpose of object detection, a de-noising 1014 (possibly tuned to increase the noise measure by $c_{dn\_det}$), demosaicing 1015 and color space correction 1016, and/or contrast enhancement 1017 may be applied.

However, the object detection is in principle also possible without preceding pre-processing, having as an input signal 002 obtained from the sensor image capturing device 1001. The object detection module 1006 provides information about position (location) of the found objects and, possibly, their respective class identifications (ID). The information about the position may be represented as list of bounding boxes 007, i.e. coordinates of locations of objects detected in the processed signal 002. Calculated bounding boxes with the corresponding class IDs are than stored in the memory module 1007 for later usage. The later usage may be in particular the object based ISP 1011.

For example, the list of bounding boxes 007 can be stored in the memory 1007 in following format:

frame index: identification (such as index within time domain) of the frame in which the objects are detected.

list of vectors with coordinates of each bounding box: for a frame with an index j, list of bounding boxes corresponding to respective detected objects. One bounding box may be defined either by its two diagonal points or by a point and a size (vertical and horizontal dimension).

IDs: a class ID may be assigned to each respective bounding box. The class ID may be any identification (number or label or the like) specifying class or the detected object in the bounding box among predefined number of object classes.

In an exemplary implementation, the following format is used for block (rectangle) based bounding boxes: $\overrightarrow{bbx} = (x, y, w_{bbx}, h_{bbx})$, where x is a horizontal coordinate of an upper left corner of the bounding box, y is a vertical coordinate of an upper left corner of the bounding box, $w_{bbx}$ is a weight in pixels of the bounding box, $h_{bbx}$ is a height in pixels of the bounding box.

As mentioned above, the present disclosure is not limited to application of the block based bounding boxes. Alternatively or in addition, other coordinate formats may be used. For example, pixel-wise coordinates may be used. If pixel-wise bounding boxes are used, than each bounding box is represented by the previously described vector $\overrightarrow{bbx} = (x, y, w_{bbx}, h_{bbx})$, and by an additional matrix mask with following size $w_{bbx} \times h_{bbx}$.

$$\text{mask}(i,j) = \begin{cases} 0, \text{ if pixel is not apart of object} \\ 1, \text{ if pixel is a part of object} \end{cases}.$$

This mask is a bitmap, which indicates for each sample of the bounding box whether or not the pixel is a part of the detected object. It is noted that such binary map may be efficient, because only one bit is required per pixel. However, it will likely require more information that the bounding box, while providing for higher precision in locating the object. Further extended schemes are possible in which per pixel there is a number (e.g. indicated by two or three bits) indicating likelihood of belonging to the detected object.

In general, according to embodiments of the disclosure a plurality of different object detection methods and schemes can be implemented by the 1006 unit, such as object detector disclosed in Redmon, Joseph and Ali Farhadi. "YOLOv3: An Incremental Improvement." CoRR abs/1804.02767 (2018). Also the face detector disclosed in Zhang, K., Zhang, Z., Li, Z., and Qiao, Y. (2016). "Joint face detection and alignment using multitask cascaded convolutional networks". IEEE Signal Processing Letters, 23(10):1499-1503 or further specific detectors that may work well for a particular type of objects can be used for 1006 unit implementation. in other words, the present disclosure is not limited to any particular object detection: any one general object detection and object classification algorithm may be applied. Moreover, a combination of object type specific and/or general detectors may be employed to increase the reliability of the detection.

After the object detection, the information 007 regarding the detected objects (such as the list of bounding boxes or the bitmaps exemplified above) is stored into the memory 1007 for later use—for example, the joint ISP 1011 uses this information to identify the parts of the image (corresponding to the detected object in the image of the cluster) to be processed in a certain way. The same information 007 is provided for further processing, namely for object recognition 1009 and possibly for the ISP for object recognition 1008 which may precede the object recognition 1009. In FIG. 3, the information 007 is also provided to a selector 1050. The selector here represents a function of (is configured for) extracting regions from the frame(s) stored in the memory.

Object Recognition

Content of specific regions with objects (bounding boxes with positions of objects 007, which were obtained previously by object detector module 1006) is obtained from the signal from sensor 002 and then each of these obtained regions may be pre-processed by ISP for object recognition 1008 before performing the actual object recognition 1009. The ISP for object recognition 1008 aims at pre-processing the input signal 002 from the sensor to make it more suitable for object recognition purposes. The application of the ISP for object recognition 1008 may improve the images for the object recognition and thus, the object recognition may provide better results. however, in general, the ISP for object recognition 1008 does not have to be employed and the object recognition 1009 may be directly applied on the signal 002 from the sensor.

Previously described general ISP depicted in FIG. 4 could be used as a specific implementation of ISP for recognition module 1008. However, a specific adaption may even further help improving the object recognition. A specific tuning of this general ISP for object recognition may include but is not limited to the above mentioned de-noising which, when performed on the basis of the detected objects already benefits over a general de-noising. This may apply for other pipeline parts, too. In general, the image region based processing (rather than image based) by itself tunes ISP performance for object recognition because such global adaptive methods as ones that are used in contrast enhancement will adapt their parameters specifically to local regions, which may greatly improve final results.

When looking at FIG. 3, the input of the ISP for object recognition 1008 is the signal 002 from the sensor and the information 007 on the detected objects. Then, the ISP 1008 pre-processes the portion of the image signal 002 corresponding to the detected objects (possibly separately and object specifically). It is noted instead of inputting image signal 002 to the ISP for object recognition, it is possible to select (e.g. using the selector 1050) from the memory only the relevant objects/bounding boxes and provide them to the module 1008. The ISP for object recognition 1008 outputs pre-processed signal 008 which is a set of image regions (or an entire frame with the image regions pre-processed). The set of pre-processed image regions or images is uploaded into the memory module 1007 for later usage, for example by applying the frame number and bounding box parameters as storage index. The later use may be here the ISP for groups of objects, which may—instead of input frames 002 process the pre-processed signal 008. However, This is only an example. It may be advantageous to directly filter the frames 002. In such case, the signal 008 dies not need to be stored in the memory (if it is passed to the object recognition 1009 directly).

Each of the obtained multiples image regions 008 (or image regions out of 002) are then processed by the object recognition unit 1009. This module may be referred to as feature extractor. As mentioned above, features are values which reflect certain image characteristics. Typically, the features may be indicators for presence, strength and/or orientation of gradient in certain image areas or indicators for other statistic features. The feature extraction may be performed in various different manners such as a convolution with some pattern in a spatial (sample) domain or by analysis in a frequency domain, or any other well-known approach.

It should be mentioned that different feature extractors could be applied depending on the information about each object class 007. For example, one feature extractor specifically for human faces and other extractor specifically for vehicles (or particular type of vehicles such as cars or drones) may be applied, which may lead to more accurate object recognition.

Object recognition module 1009 generates a sequence of numbers, i.e. feature vector, for each input image region, 008. These feature vectors may in general have a following property: distances between the feature vectors extracted from image regions containing same object or similar object are smaller than distances between feature vectors from image regions containing dissimilar objects. The finally obtained feature vectors are uploaded into the memory module 1007 for later usage by using frame and bounding box parameters as storage index. Different state-of-the-art methods can be used for this module implementation, such as face recognition algorithm described in Schroff, Florian et al. "FaceNet: A unified embedding for face recognition and clustering." 2015 IEEE Conference on Computer Vision and Pattern Recognition (CVPR) (2015): 815-823 or a feature extractor from Liao, Xingyu et al. "Video-based Person Re-identification via 3D Convolutional Networks and Nonlocal Attention." ACCV (2018). However, in general, any available feature extractors may be employed. The technology of feature extraction has been used widely in object recognition in many different application fields such as face recognition, vehicle recognition, medical imaging, or the like.

The present disclosure is not limited to any particular filed of application. Rather, it may be applied to general preprocessing of videos with very diverse contents or fine-tuned for specific applications by using feature extractors and/or other (pre-)processing steps specifically designed for a certain class of objects. Combinations of general and specific feature extractors may be employed, for instance based on the results of object classification or some a-priori information (such as a pre-classification of the video) input by the user or as a meta-data associated with the processed video sequence. The selection of the appropriate feature extractor may be performed according to a predefined association between the object class and the feature extractor.

Clustering

The clustering unit/module 1010 is used for grouping similar feature vectors from current processing frame and a number of feature vectors from previously processed frames 010, if any are available in memory 1007. In other words, the input into the clustering module 1010 is the feature vector 009 produced for one or more objects detected in the current image (video frame) in the object recognition module 1009. In addition, the input into the clustering module 1010 is/are the feature vector(s) 009 read from the memory (e.g. based on the frame number and the bounding box identifications) and extracted beforehand from the previously processed frames for the objects detected therein.

The clustering forms groups of objects considering distances between feature vectors in such a way that same and similar objects are mapped to the same group (cluster). According to an embodiment, object clusters are constructed every time after processing of N frames, where N is a parameter, which can be specified by a user or predefined, or set depending on frame rate of the video, or considering the amount of change in time of the video. One possible setting would be to select N corresponding to ca. 0.2 to 2 seconds of the video. However, this is only an example, and—as mentioned above—N may be selected to be smaller, e.g. 5±3 frames or the like, in order to limit the complexity and increase the speed of processing. As is clear to those skilled in the art, the selection of the appropriate N may be performed with regard to the particular application requirements, available hardware, expected character of the video content (e.g. amount of object or camera motion), and/or other considerations.

There are the following exemplary options for implementation of the clustering:

a) Clustering of an identical one object present in N frames, resulting in cluster size of N. This kind of clustering may be particularly relevant for applications in which there is at most one object with the same identity per frame and the group pre-processing 1011 is performed per groups of identical objects. Such clustering may be considered as temporal.

b) Clustering of similar objects present in N frames. Here, there may be more similar objects in one frame. Accordingly, the cluster size may vary depending on the number of the similar objects in the N frames. The group pre-processing 1011 is performed per groups of similar objects detected in the same frames and in different frames. This may be also considered as temporal clustering, or, more specifically, as spatio-temporal It is noted that in view of the temporal domain correlation of the frames, temporal domain clustering is likely to provide advantages (exploited in both options a) and b)). However, for some specific applications clustering of the similar objects in a single frame and the group pre-processing based on similar objects from the same frame without considering a plurality of frames may be beneficial. This may be especially the case for applications in which there are many objects which look similar and in which the individual identification of the object is not important. Such clustering may be considered as spatial.

After clustering, the next N frames are processed (by the joint ISP 1011) using the already constructed clusters by mapping new feature vectors to the nearest existing cluster. To avoid any delay, one can consider the first frame in the video as an exception and therefore clustering can be done using feature vectors from this first frame only. This is possible if option b) above is applied. Otherwise, the clustering may start, for instance, from the second frame with N=1.

In other words, the clustering module 1010 performs identification of clusters every N-th frame. identification of clusters means determining the number of clusters and their representative feature vector ("center") which may be obtained as a mean of the feature vectors across the feature vectors of the objects belonging to the cluster.

Different state-of-the-art methods can be implemented for construction of the new clusters, such as the-state-of-the-art K-means method described, e.g., in Lloyd., S. P. (1982). "Least squares quantization in PCM". IEEE Transactions on Information Theory. 28 (2): 129-137, which constructs selected number of clusters. The number of clusters can be identified using following iterative approach:

0. Initialization step: initialize number of clusters by value k=2.
1. Construct k clusters using algorithm from S. P. Lloyd mentioned above and measure mean distance $\mu_{c_t}$ between samples and their cluster centers.
2. Compare the mean distance $\mu_{cl}$ for the current value of clusters k with a defined threshold $Thr_{cluster}$. If $\mu_{cl}>Thr_{cluster}$, than one increments cluster number k and goes to step 1. Stop procedure otherwise.

The threshold $Thr_{cluster}$ may be set empirically and/or based on quality-complexity optimization.

It is noted that in case of purely temporal clustering (option a) above), the estimation of the number of clusters may be unnecessary, since the number of objects detected in the object detection 1006 may be a good estimation of the number of clusters. However, in case of option b) mentioned above (temporal clustering also allowing for more than one similar objects in the same frame), the estimation of the number of clusters may be advantageous. The present disclosure is not limited to the above-mentioned exemplary determination of a number of clusters.

After clusters are constructed (after processing an N-th frame), each feature vector from a new to be processed frame is assigned to an appropriate cluster with minimal distance measure from the cluster (e.g. cluster center referred to as representative vector above) to feature vector. Plurality of different distance measures can be implemented in the clustering unit 1010 for measuring distance between feature vectors 009 and 010, such as a Euclidean distance, Chebyshev distance, or a cosine similarity or a combination of them. It is noted that the cluster center may be calculated as a mean of the feature vectors across respective cluster, or as a median or other statistic feature.

The result of clustering 011 is then passed to the memory and to the joint ISP 1011. The result of clustering is the cluster identification, which may include the number of clusters and a representative feature vector of each cluster. This is stored into the memory module 1007 in this example, as it may be used to classify objects of the following frames. As mentioned above, cluster identification may be performed every N frames. Actually, N may be 1 or more. If N is one, the clustering is performed for every other frame. Moreover, a further result of clustering for each frame is an assignment of the detected objects in the frame to the identified clusters. This information may be passed directly to the joint ISP module 1011 for processing or may also be stored in the memory 1007, depending on implementation.

The present disclosure is not limited to the above-mentioned clustering using N frames to cluster objects and updating the clustering every N frames, N being also the number objects (frames) in the group to be pre-processed jointly. Implementations are possible, in which the number of used frames to derive clusters may differ from the number of objects (frames) to be jointly preprocessed and from the number of frames after which the clustering is updated.

Temporal Object-Based Group Processing

Once the objects are identified and grouped over a plurality of frames, the joint object-based ISP 1011 is performed.

The joint object-based ISP 1011 processes data from the sensor 002, together with information about the identified groups (clusters) of objects in the current frame and previously processed one or more frames 012, and with the image regions 011 corresponding to the respective groups of objects. The joint object-based ISP unit 1011 implements a specific ISPs for specific groups of objects 011 and/or general ISP with specifically tuned parameters for some groups of objects. Thus it is referred to as object-specific ISP. The term "joint" relates to the fact that the images pertaining to the same object group (cluster) are processed in the same manner, i.e. by the same specific ISP or by the general ISP with parameters tuned in the same manner.

In general, various state-of-the-art approaches can be used for implementation of the unit 1011, such as the ISP pipelines disclosed in Hyun Sang Park. Chapter "Architectural Analysis of a Baseline ISP Pipeline" in book "Theory and Applications of Smart Cameras" published by Springer Netherlands, 20 Jul. 2015, or the like. The ISP 1011 may follow the ISP pipeline shown in FIG. 4. In particular, all steps for ISP tuning for object recognition 1008 can also be applied for joint object-based ISP unit 1011.

It is noted that not all stages of the general ISP in FIG. 4 are necessarily performed. Moreover, even among those which are performed, not all have to work group (cluster) specifically.

De-noising 1014 is a stage which may provide improvement if processed object-based. In particular, the de-noising of current object region using similar blocks (sub-regions) from the same object group from the current and/or neighboring temporal frames may benefit from de-noiser adaption for the specific group. This method cannot be applied with such efficiency for tuning ISP for object recognition 1008 because during the ISP tuning for object recognition 1008, temporal information is not used and because, without preparation of similar objects groups, dissimilar objects would possibly be used in joint de-noising. Usage of dissimilar objects will lead to usage of dissimilar blocks in averaging of blocks de-noising procedure and this may lead to blurriness of the result. In other words, one possible de-nosing procedure finds similar blocks of pixels in a neighboring area and then applies averaging. Advantageously, the blocks are rather small (smaller than the size of the object region/bounding box), such as 2×2 or 4×4 or 2×4 8×4 or any size, even not being power of two. For example, if there are bounding boxes with a human face and they are merely averaged, there may be some misalignments of some details, for example due to changing of pose. Therefore, some small blocks similar between the similar object regions are found. For example only eye-block or only cheek block, or the like. Accordingly, the joint temporal processing in some embodiments may include averaging of the object images/bounding boxes. In other embodiments, in addition or alternatively to averaging, the joint pre-processing includes a block-based image-enhancement as mentioned above.

In order to perform adaptive de-noising, in general, any adaptive filtering approach may be applied. As an example, a method described in Buades, Antoni (20-25 Jun. 2005). "A non-local algorithm for image denoising." Computer Vision and Pattern Recognition, 2005. 2. pp. 60 and referred to as NLM can be used as a basis for such de-noising approach. The idea behind the NLM is that each pixel of the input image color component 1 with a size W×H (width times height) is replaced by a weighted average of all other pixels:

$$\hat{I}(i,j) = \sum_{k \in [1,H]} \sum_{l \in [1,W]} w(i,j,k,l) I(k,l),$$

where w(i, j, k, l)—weight value which represents similarity between neighbourhood of pixel I(i, j) and I(k, l) and is calculated using the following equation:

$$w(i,j,k,l) = \frac{1}{Z(i,j,k,l)} e - \frac{\|\mathcal{N}(i,j) - \mathcal{N}(k,l)\|_2^2}{h^2},$$

where $N(i, j)$ is a vector with all neighbouring values of the pixel $I(i, j)$; and $Z(i,j,k,l)$ is a following normalizing constant:

$$Z(i,j,k,l) = \sum_{k \in [1,H]} \sum_{l \in [1,W]} w(i,j,k,l)$$

Above, $\|\cdot\|_2$ refers to square norm.

The NLM approach is applied in a temporal mode, i.e. to each image of the same group, using the rest of images from the group as analogue of previously processed images. Temporal NLM here finds analogue blocks in the regions belonging to the same cluster.

In other words, each newly de-noised value is calculated as a weighted average over all pixels (coordinates k, l) from all image object regions (coordinate t) in the group.

$$\hat{I}(i,j) = \sum_{t \in [1,T]} \sum_{k \in [1,H]} \sum_{l \in [1,W]} w(i,j,k,l) I(k,l),$$

where T is a number of images in group. This is a modification of the NLM which worked with entire frames rather than object regions. Herein, not all pixels of the image (frame) will be used for weighting average, but rather only pixels (samples) from similar objects will be used for de-noising which improves final de-noising performance.

Images from the same group can have different size. This is caused by the fact that the same object may change shape or size between the video frames. The de-noising method can be implemented, e.g. in two ways. According to the first way, one of the following image interpolation methods can be applied to resize the images according to the size of the currently de-noising image from respective group: nearest neighbor interpolation, bilinear interpolation, bicubic interpolation, Lancoz resampling or the like. According to the second way, images without resizing may be used. For example, some approaches (as mentioned above) employ small sub-blocks (e.g. having the same predetermined size). Even though objects may have different sizes, their sub-blocks may have similar statistics and can be compared to denoise them together. This may provide fan efficient mean for denoising (image enhancement). Compared to the resizing, it provides the advantage that the statistics of the subblocks is maintained. Resizing may change the statistics and result in artifacts. However, the present disclosure is not limited to any particular denoising and these are mere examples.

The object-based ISP 1011 outputs enhanced image, which is processed at least in the regions in which one or more objects were recognized. However, it is noted that the present disclosure may also apply a combination of a general de-noising also used to de-noise, e.g. the background object. Moreover, the object-based ISP 1011 may be selectively used only to a certain object class, such as human face. All other objects may be processed with the general ISP pipeline or the like.

Exemplary Test Setup

An exemplary implementation was tested using the following set-up:

Used camera's sensor provided signal in a specific CFA Bayer pattern. This pattern measures following primary colors: red (R), green (G), or blue (B) in each spatial point.

Same ISP as described in Hyun Sang Park mentioned above, but with applied tuning steps for object detection described above was used for implementation of object detection unit 1005. The constant $c_{dn\_det}$=1.5 was used for this implementation.

MTCNN face detector was used as an object detector unit. This face detector provides coordinates of bounding boxes for each found face in the image (video frame).

Same ISP as described in Hyun Sang Park was used, but with applied tuning steps for object recognition described above. For implementation of unit 1008 the constant of $c_{dn\_rec}$=0.005 was used.

FaceNet solution described in the Zhang, K., Zhang, Z., Li, Z., and Qiao, Y. (2016) was used as the object recognition unit 1009. This module provides feature vector for each input image region with a face in such a way that the Euclidean distance between feature vector of a face of the same person is relatively small compared with distance between feature vectors obtained for faces of different persons.

K-means method with Euclidian distance for measuring the distance was used for clustering of feature vectors into groups.

A modification of the ISP described in Hyun Sang Park was used for implementation of ISP unit 1011. The modification was represented by applying the contrast enhancement for each found object region and joint de-noising applied for each group of similar objects, where each group of objects was represented by same person's face regions from N neighboring (preceding) frames. N=1 was used for the implementation, meaning that only one preceding frame is used in addition to the current frame. The frame may be the immediately preceding frame.

Figure 9:
FIG. 9 are images output at different stages of the image pre-processing.
Figure 9:
Figure 10:
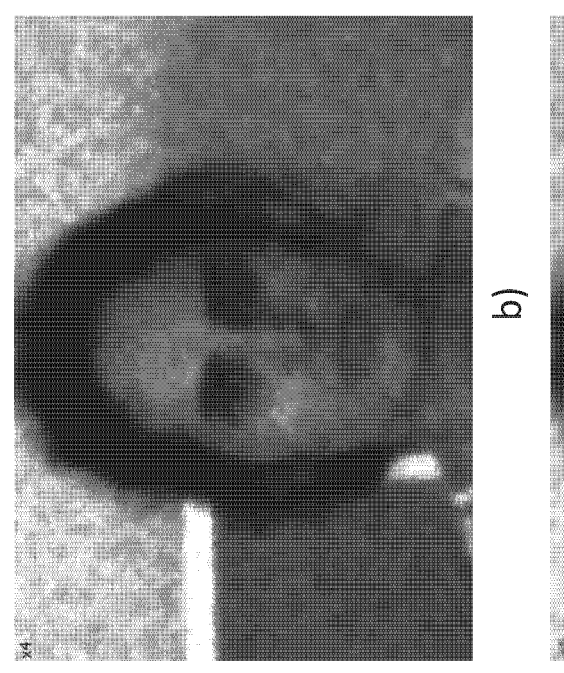
FIG. 10 are excerpts from the images output at different stages of the image pre-processing showing a detail of a face.
Figure 10:
Figure 10:
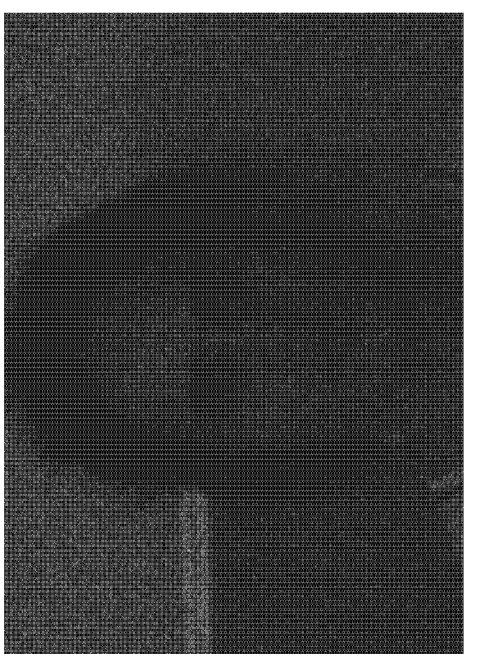
Figure 10:

FIGS. 9 and 10 show, for illustration purposes, the visually enhanced images shown in grayscale. Face regions are less noisy and well contrasted. The face regions are also sharper because usage of object recognition and groups of objects may provide a more accurate and delicate de-noising method for usage.

In particular, FIG. 9 shows an example of Bayer signal processing as described above (exemplary test implementation). In part a) of the figure, input image with a low quality Bayer signal is shown. In part b), the output of ISP without considering information about groups of objects is shown, i.e. output of the object detection ISP 1005. Part c) represents results of the ISP tuned for object recognition 1008 without actual usage of object recognition. The clustering 1010 for groups of objects and the object-specific ISP 1011 output is shown in part d).

Figure 5:
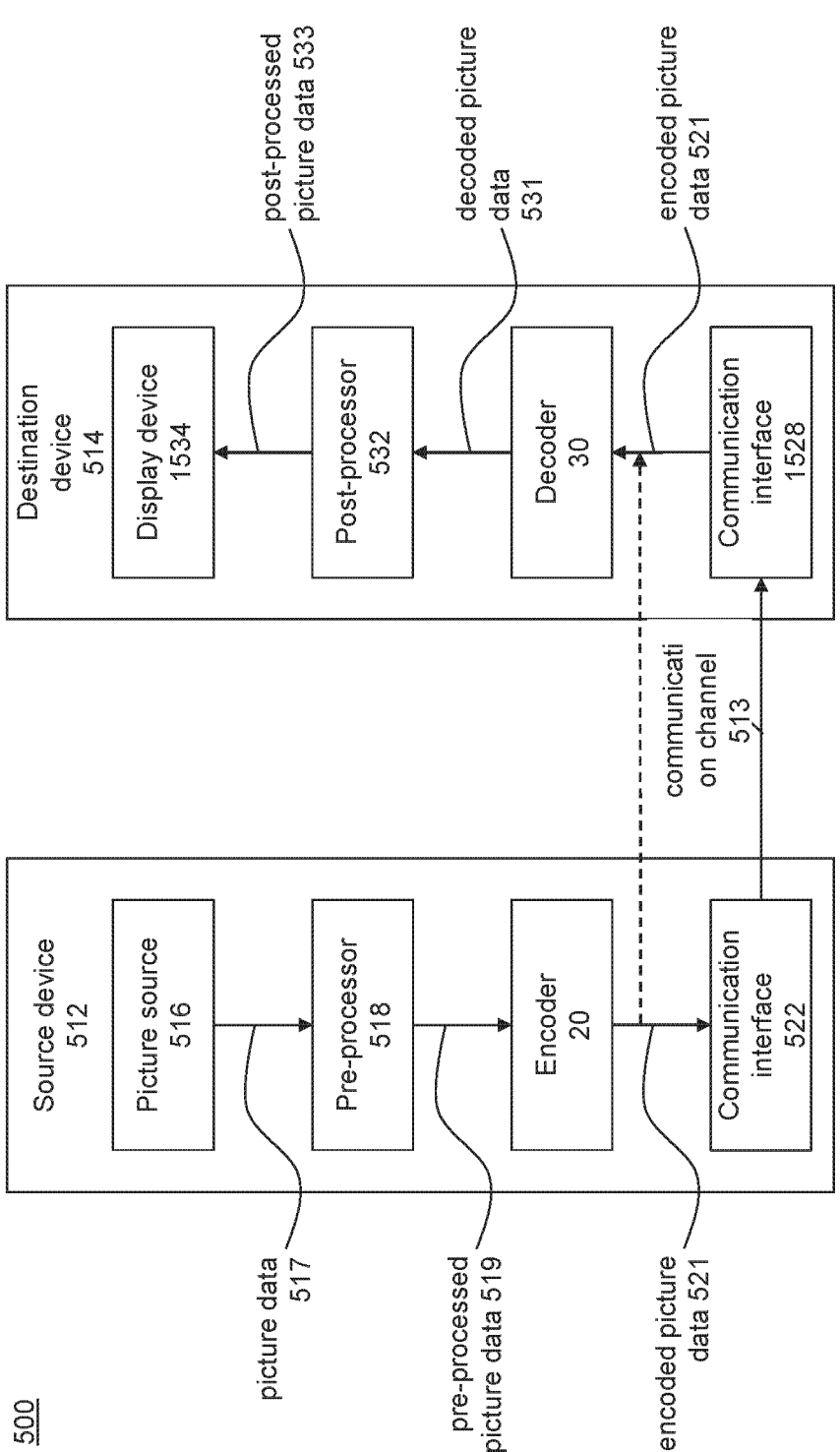
FIG. 5 is a block diagram showing an example of a video coding system configured to implement embodiments of the disclosure.

FIG. 10 provides a zoomed region of interest for a detailed methods comparison. In particular, FIG. 5 shows in part a) the low quality Bayer input signal. Part b) shows output of the ISP 1005 without considering information about groups of objects. Part c) represent results of the ISP tuned for object recognition 1008 without actual usage of object recognition. The clustering 1010 for groups of objects and object-specific ISP 1011 are shown in part d).

In summary, the present disclosure provides apparatuses and methods for video image (frame) pre-processing. For example, an image processing apparatus 1000 is provided for processing a raw image 002 of a scene into an enhanced final image 003 of the scene. The image processing apparatus 1002 comprises processing circuitry 1005 configured to transform the raw image 002 into an enhanced image 006. Computer vision processing circuitry 1006 is configured to detect positions of objects and information about their classes 007 in the enhanced image 006, where information about existing classes is stored inside computer vision processing circuitry 1006. Another image processing circuitry 1008 is configured to transform the raw image 002 into the enhanced image 008. Computer vision processing circuitry 1009 is configured to calculate a specific sequence of number i.e. one feature vector for each image region 008 corresponding to one detected object 007, wherein clustering processing circuitry 1010 is configured to process objects feature vectors from current processing frame 009 and object feature vectors from one or more previously processed frames 010 and to provide sets of feature vectors grouped according to a similarity measure between them 011. Image processing circuitry 1011 is configured to transform the raw image 002 into the final enhanced image 003 using information about objects in current and previous frames 011.

The enhanced final image 003 may be an RGB image and wherein the raw image 002 is a Bayer image. The image processing apparatus 1000 may further comprise an image capturing device 1001, in particular a camera, wherein the image capturing device 1001 is configured to capture the raw image of the scene. The computer vision processing circuitry 1005 may be configured to detect positions of objects by a YOLO, MobileNet, SSD, SSH or MTCNN face detector. For example, the detected positions of objects are block based (e.g. framed by a bounding box) or pixel-wise.

The computer vision processing circuitry 1009 may be configured to calculate a specific sequence of number i.e. feature vector for each input image is a FaceNet or feature extractor from Liao, Xingyu et al. "Video-based Person Re-identification via 3D Convolutional Networks and Non-local Attention." ACCV (2018). For instance, the clustering processing circuitry 1010 is configured to perform K-means clustering. The similarity measure used for clustering may be Euclidean distance, Chebyshev distance, or a cosine similarity.

The processing circuitry may be configured to implement an image signal processing chain 1005 for transforming the enhanced raw image into the enhanced final image. The present disclosure also provides a computer program product comprising program code for performing the method 1002 as described above, when executed on a computer or a processor.

As mentioned above, the present disclosure may be used for video encoding. For example, a method for encoding video includes the method described above for processing frames of the video in raw image format; and encoding the processed frames of the video by applying lossy and/or lossless compression.

Any of the above-mentioned methods can be implemented by an apparatus with the correspondingly configured processing circuitry. Vice versa, steps performed by the described devices pertain to a method.

For example, an apparatus is provided for processing frames of the video in raw image format, the apparatus comprising: processing circuitry configured to: identify an object in image regions of at least two respective frames of the video sequence; and jointly process of the image regions that contain the identified object by an image processing adapted to the identified object and different from image processing applied to image regions in the at least two respective frames not containing the identified object. The apparatus may further comprising image sensor for capturing the video in raw image format.

In summary, raw data from the sensor are processed by an ISP pipeline tuned specifically for object detection pertaining to some specified classes, e.g. human faces, cars, etc. Information about the specified classes may be contained and stored inside object detection module on the camera side. Processed ISP for detection output is then processed using computer vision analytic: object detection procedure. Object detection procedure provides location of all found objects and information about their specific class of objects (i.e. class ID).

Then all regions in raw data which corresponds to previously detected objects are processed by ISP pipeline tuned specifically for object recognition (will be further named as "ISP for recognition"). Results of ISP for recognition are then processed by another computer vision analytic: recognition procedure. Recognition procedure, also known as feature extraction, provide a single feature vector for each input region which corresponds to each detected specific object. All objects from different temporal frames are grouped by their feature vectors using clustering procedure—objects with similar feature vectors (details about feature vectors similarity will be provided in the next section alongside details about clustering) actually are the same or represents similar objects. ISP pipeline with tuned parameters for each group of object (will be further named as "joint objects ISP") applied for picture regions correspondent to each group of objects.

An exemplary system which may deploy the above-mentioned pre-processing is an encoder-decoder processing chain illustrated in FIG. 5. FIG. 5 is a schematic block diagram illustrating an example coding system 500, e.g. a video coding system 500 (or short coding system 500) that may utilize techniques of this present application. Video encoder 20 (or short encoder 20) and video decoder 30 (or short decoder 30) of video coding system 510 may be any of the available or not yet available video encoders and decoders. As shown in FIG. 5, the coding system 510 comprises a source device 512 configured to provide encoded picture data 521 e.g. to a destination device 514 for decoding the encoded picture data 513.

The source device 512 comprises an encoder 20, and may additionally, i.e. optionally, comprise a picture source 516, a pre-processor (or pre-processing unit) 518, e.g. a picture pre-processor 518, and a communication interface or communication unit 522.

The picture source 516 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 518 and the processing performed by the pre-processing unit 518, the picture or picture data 517 may also be referred to as raw picture or raw picture data 517 (corresponding to signal 002 mentioned above).

The pre-processor 518 is configured to receive the (raw) picture data 1517 and to perform pre-processing on the picture data 1517 to obtain a pre-processed picture 1519 or pre-processed picture data 1519. Pre-processing performed by the pre-processor 1518 may, e.g., comprise trimming, color format conversion (e.g. from RGB to YCbCr), color correction, or de-noising. It can be understood that the pre-processing unit 1518 may be optional component. The pre-processing 518 may be implemented by the temporal object-dependent ISP 1002 shown in FIG. 1 and represents examples of devices that may be configured to perform techniques in accordance with various examples described in the present application.

The video encoder 20 is configured to receive the pre-processed picture data 519 (corresponding to signal 003) and provide encoded picture data 521. A communication interface 522 of the source device 512 may be configured to receive the encoded picture data 521 and to transmit the encoded picture data 521 (or any further processed version thereof) over communication channel 513 to another device, e.g. the destination device 514 or any other device, for storage or direct reconstruction. The destination device 514 comprises a decoder 30 (e.g. a video decoder 30), and may additionally, i.e. optionally, comprise a communication interface or communication unit 528, a post-processor 532 (or post-processing unit 532) and a display device 534.

The communication interface 528 of the destination device 514 is configured receive the encoded picture data 521 (or any further processed version thereof), e.g. directly from the source device 512 or from any other source, e.g. a storage device, e.g. an encoded picture data storage device, and provide the encoded picture data 521 to the decoder 30. The communication interface 522 and the communication interface 528 may be configured to transmit or receive the encoded picture data 521 or encoded data 513 via a direct communication link between the source device 512 and the destination device 514, e.g. a direct wired or wireless connection, or via any kind of network, e.g. a wired or wireless network or any combination thereof, or any kind of private and public network, or any kind of combination thereof.

The communication interface 522 may be, e.g., configured to package the encoded picture data 521 into an appropriate format, e.g. packets, and/or process the encoded picture data using any kind of transmission encoding or processing for transmission over a communication link or communication network. The communication interface 528, forming the counterpart of the communication interface 522, may be, e.g., configured to receive the transmitted data and process the transmission data using any kind of corresponding transmission decoding or processing and/or de-packaging to obtain the encoded picture data 521.

Both, communication interface 522 and communication interface 528 may be configured as unidirectional communication interfaces as indicated by the arrow for the communication channel 513 in FIG. 5 pointing from the source device 512 to the destination device 514, or bi-directional communication interfaces, and may be configured, e.g. to send and receive messages, e.g. to set up a connection, to acknowledge and exchange any other information related to the communication link and/or data transmission, e.g. encoded picture data transmission. The decoder 30 is configured to receive the encoded picture data 1521 and provide decoded picture data 531 or a decoded picture 31.

The post-processor 532 of destination device 514 is configured to post-process the decoded picture data 531 (also called reconstructed picture data), e.g. the decoded picture 531, to obtain post-processed picture data 533, e.g. a post-processed picture 533. The post-processing performed by the post-processing unit 532 may comprise, e.g. color format conversion (e.g. from YCbCr to RGB), color correction, trimming, or re-sampling, or any other processing, e.g. for preparing the decoded picture data 531 for display, e.g. by display device 534.

The display device 534 of the destination device 514 is configured to receive the post-processed picture data 533 for displaying the picture, e.g. to a user or viewer. The display device 534 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 5 depicts the source device 512 and the destination device 514 as separate devices, embodiments of devices may also comprise both or both functionalities, the source device 512 or corresponding functionality and the destination device 514 or corresponding functionality. In such embodiments the source device 512 or corresponding functionality and the destination device 514 or corresponding functionality may be implemented using the same hardware and/or software or by separate hardware and/or software or any combination thereof. As will be apparent for the skilled person based on the description, the existence and (exact) split of functionalities of the different units or functionalities within the source device 512 and/or destination device 514 as shown in FIG. 5 may vary depending on the actual device and application.

Figure 6:
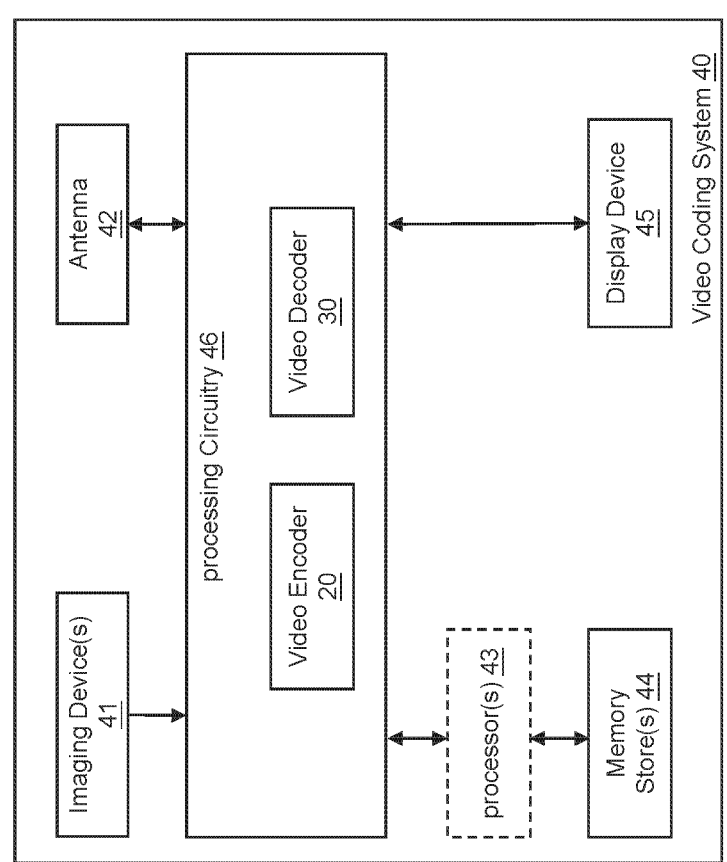
FIG. 6 is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 6, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules of the encoder 20 and/or any other encoder system or subsystem described herein. The decoder 30 may be implemented via processing circuitry 46 to embody the various modules of the decoder 30 and/or any other decoder system or subsystem described herein. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 6. The processing circuitry 46 may further implement the pre-processing 1002 (518). However, the present disclosure is not limited thereto, and the pre-processing 1002 (518) may be also already part of the imaging device(s) 41.

Source device 512 and destination device 514 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 512 and the destination device 514 may be equipped for wireless communication. Thus, the source device 512 and the destination device 514 may be wireless communication devices.

In some cases, video coding system 500 illustrated in FIG. 5 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC but rather aimed at their next generations and/or any other codecs.

Figure 7:
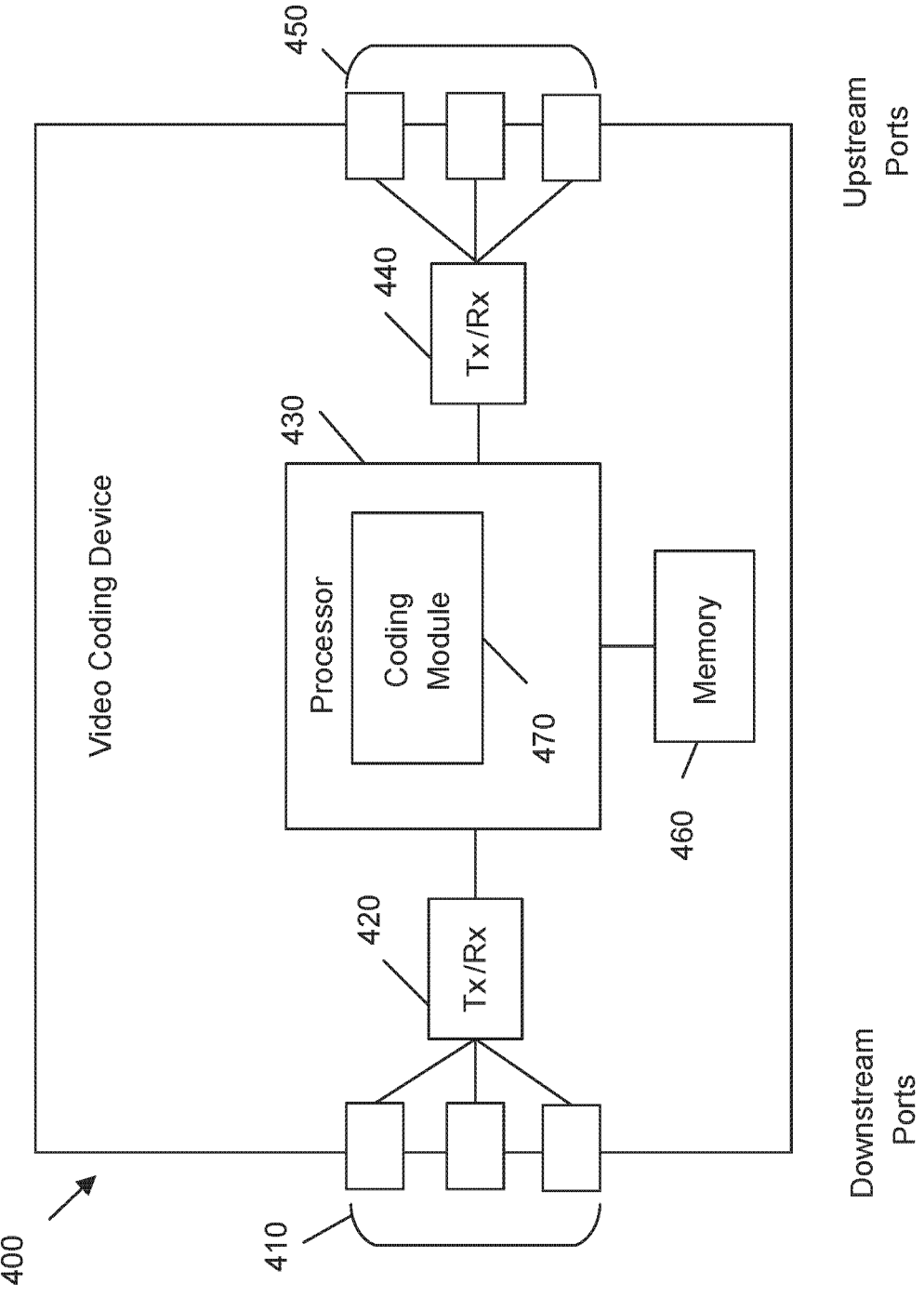
FIG. 7 is a block diagram illustrating an example of an encoding apparatus or a decoding apparatus.

FIG. 7 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 5 or an encoder such as video encoder 20 of FIG. 5, possibly integrated with the pre-processing 518 (1002).

The video coding device 400 comprises ingress ports 410 (or input ports 410) and receiver units (Rx) 420 for receiving data; a processor, logic unit, or central processing unit (CPU) 430 to process the data (including the pre-preprocessing of the present application); transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations, including the pre-processing 518 (1002). The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM). The memory module 1007 mentioned above may be part of the memory, or may be provided as a separate memory in some implementations.

Figure 8:
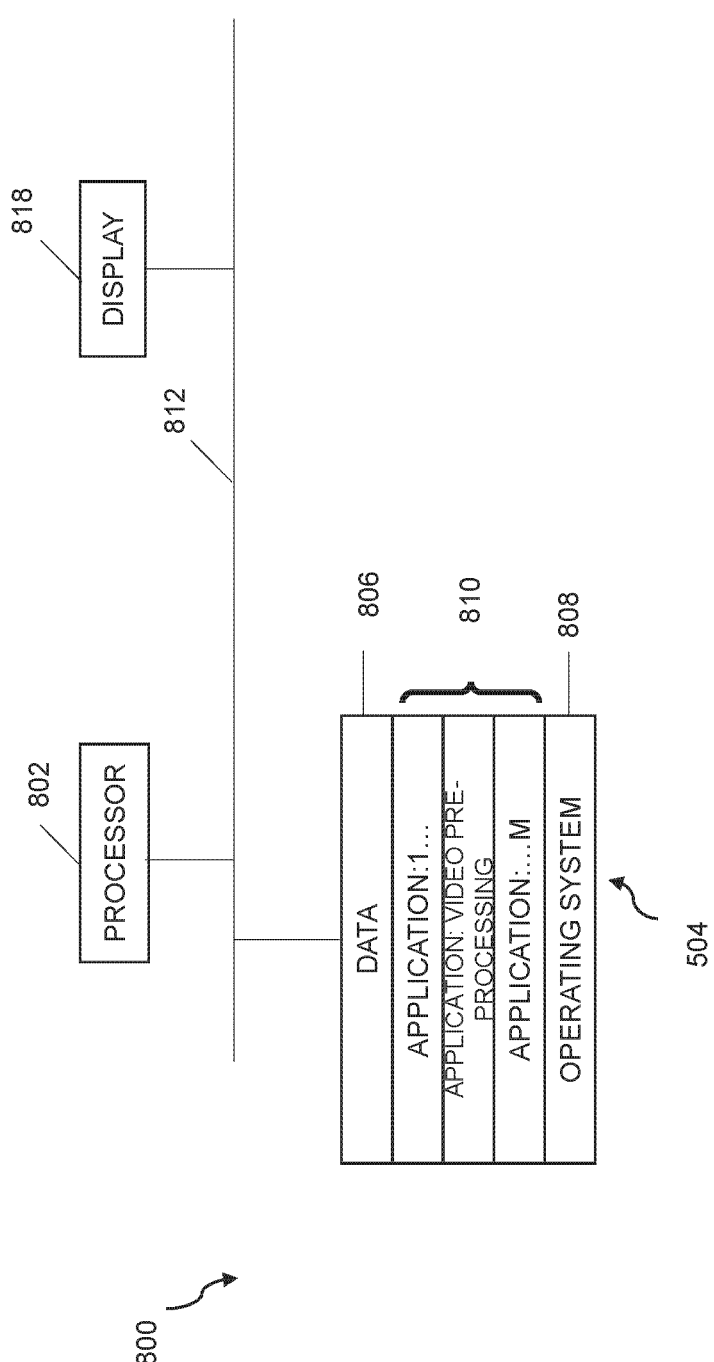
FIG. 8 is a block diagram illustrating another example of an encoding apparatus or a decoding apparatus.

FIG. 8 is a simplified block diagram of an apparatus 800 that may be used as either or both of the source device 512 and the destination device 514 from FIG. 5 according to an exemplary embodiment. The apparatus 800 may also separately implement the pre-processing 518.

A processor 802 in the apparatus 800 can be a central processing unit. Alternatively, the processor 802 can be any other type of device, or multiple devices, capable of manipulating or processing information now-existing or hereafter developed. Although the disclosed implementations can be practiced with a single processor as shown, e.g., the processor 802, advantages in speed and efficiency can be achieved using more than one processor.

A memory 804 in the apparatus 800 can be a read only memory (ROM) device or a random access memory (RAM) device in an implementation. Any other suitable type of storage device can be used as the memory 804. The memory 804 can include code and data 806 that is accessed by the processor 802 using a bus 812. The memory 804 can further include an operating system 808 and application programs 810, the application programs 810 including at least one program that permits the processor 802 to perform the methods described here. For example, the application programs 810 can include applications 1 through M, which may further include a video preprocessing application that performs the methods described here.

The apparatus 800 can also include one or more output devices, such as a display 818. The display 818 may be, in one example, a touch sensitive display that combines a display with a touch sensitive element that is operable to sense touch inputs. The display 818 can be coupled to the processor 802 via the bus 812.

Although depicted here as a single bus, the bus 812 of the apparatus 800 can be composed of multiple buses. Further, the secondary storage 814 can be directly coupled to the other components of the apparatus 800 or can be accessed via a network and can comprise a single integrated unit such as a memory card or multiple units such as multiple memory cards. The apparatus 800 can thus be implemented in a wide variety of configurations.

Summarizing, the present disclosure relates to pre-processing of video images. In particular, the video images are pre-processed in an object-based manner, i.e. by applying different pre-processing to different objects detected in the image. Moreover, the pre-processing is applied to a group of images. This means that object detection is performed in a plurality of images and the pre-processing for the plurality of images may be adapted to the decoded images and is applied to the decoded images.

What is claimed is:

1. A method for processing frames of a video sequence in raw image format, the method comprising:

performing pre-processing on at least two respective frames of the video sequence, wherein the pre-processing includes filtering the at least two respective frames with a filter of which parameters are set according to a size of an object to be detected in the at least two respective frames;

identifying the object included in image regions of the at least two respective frames of the video sequence, wherein identifying the object comprises:

detecting a location of the object within the at least two respective frames by distinguishing the object from other parts of the at least two respective frames; and recognizing an identity of the object in the at least two respective frames based on detecting the location of the object within the at least two respective frames, wherein the performing pre-processing on the at least two respective frames of the video sequence is performed before the recognizing the identity of the object; and processing the image regions in the at least two respective frames that include the object by a first image processing adapted to the object and different from a second image processing applied to image regions in the at least two respective frames not including the object, wherein the first image processing includes de-noising with a de-noising filter of which at least one parameter is determined based on an object bounding box of the object and a size of the object bounding box included in the at least two respective frames, and wherein the at least one parameter includes a volume in a number of samples of the object bounding box.

2. The method according to claim 1, wherein the recognizing the identity of the object comprises:

computing a plurality of feature vectors for a plurality of image regions in the at least two respective frames, wherein computing of a feature vector of the plurality of feature vectors for a given frame includes determining a value of at least one feature of the image region of the given frame; and forming a cluster based on the feature vectors, wherein the cluster includes image regions of the at least two respective frames, the image regions including the object with the same recognized identity.

3. The method according to claim 2, wherein the forming the cluster is performed by K-means approach; and/or wherein the forming the cluster is based on determining a similarity measure of feature vectors calculated for the image regions in different frames among the at least two respective frames, wherein the similarity measure employed is one of Euclidean distance, Chebyschev distance, or cosine similarity.

4. The method according to claim 1, wherein the identifying the object further comprises: detecting one or more classes of the object; and wherein the recognizing of the identity of the object is based on at least one of the one or more detected classes of the object.

5. The method according to claim 4, wherein the detecting of the location of the object and the detecting the one or more classes of the object is performed by a YOLO (You Only Look Once) object detection algorithm, a mobileNet object detection algorithm, a SSD (Single Shot Multibox Detector) object detection algorithm, a SSH (Single Stage Headless) face detection algorithm, or a MTCNN (Multi-task Cascaded Convolutional Neural Network) face detection algorithm.

6. The method according to claim 1, wherein the performing the pre-processing further includes:

filtering the at least two respective frames with a filter adapted to a type of the identity of the object.

7. The method according to claim 1, further comprising:

obtaining the at least two respective frames from an image sensor;

wherein the first image processing and/or the second image processing comprises performing at least one of:

defect pixel correction, white balance, de-noising, demosaicing, color space correction, color enhancement, contrast enhancement, sharpening, or color transformation.

8. The method according to claim 1, wherein the raw image format is a Bayer pattern and the performing pre-processing includes conversion of the at least two respective frames into an RGB (red-green-blue) image format.

9. The method according to claim 1, wherein the at least two respective frames are:

temporally adjacent frames; or more than two frames equally spaced in a time domain.

10. The method according to claim 1, further comprising:

encoding the at least two respective frames of the video sequence by applying lossy and/or lossless compression.

11. A non-transitory computer-readable storage medium that stores a computer program that, when executed on one or more processors, causes the one or more processors to execute operations comprising:

performing pre-processing on at least two respective frames of a video sequence, wherein the pre-processing includes filtering the at least two respective frames with a filter of which parameters are set according to a size of an object to be detected in the at least two respective frames;

identifying the object included in image regions of the at least two respective frames of the video sequence, wherein identifying the object comprises:

detecting a location of the object within the at least two respective frames by distinguishing the object from other parts of the at least two respective frames; and recognizing an identity of the object in the at least two respective frames based on detecting the location of the object within the at least two respective frames, wherein the performing pre-processing on the at least two respective frames of the video sequence is performed before the recognizing the identity of the object; and processing the image regions in the at least two respective frames that include the object by a first image processing adapted to the object and different from a second image processing applied to image regions in the at least two respective frames not including the object, wherein the first image processing includes de-noising with a de-noising filter of which at least one parameter is determined based on an object bounding box of the object and a size of the object bounding box included in the at least two respective frames, and wherein the at least one parameter includes a volume in a number of samples of the object bounding box.

12. An apparatus for processing frames of a video sequence in raw image format, the apparatus comprising:

processing circuitry configured to:

perform pre-processing on at least two respective frames of the video sequence, wherein the pre-processing includes filtering the at least two respective frames with a filter of which parameters are set according to a size of an object to be detected in the at least two respective frames;

identify the object in image regions of the at least two respective frames of the video sequence, wherein identifying the object comprises:

detecting a location of the object within the at least two respective frames by distinguishing the object from other parts of the at least two respective frames; and recognizing an identity of the object in the at least two respective frames based on detecting the location of the object within the at least two respective frames, wherein the performing pre-processing on the at least two respective frames of the video sequence is performed before the recognizing the identity of the object; and process the image regions in the at least two respective frames that include the object by a first image processing adapted to the object and different from a second image processing applied to image regions in the at least two respective frames not including the object, wherein the first image processing includes de-noising with a de-noising filter of which at least one parameter is determined based on an object bounding box of the object and a size of the object bounding box included in the at least two respective frames, and wherein the at least one parameter includes a volume in a number of samples of the object bounding box.

13. The apparatus according to claim 12, further comprising:

an image sensor for capturing the video sequence in the raw image format.

14. The method according to claim 1, wherein the location of the object is a location of a bounding box framing the object or a pixel map.

15. The computer-readable storage medium according to claim 11, wherein the recognizing the identity of the object comprises:

computing a plurality of feature vectors for a plurality of image regions in the at least two respective frames, wherein computing of a feature vector of the plurality of feature vectors for a given frame includes determining a value of at least one feature of the image region of the given frame; and forming a cluster based on the feature vectors, wherein the cluster includes image regions of the at least two respective frames, the image regions including the object with the same recognized identity.

16. The computer-readable storage medium according to claim 15, wherein the forming the cluster is performed by K-means approach; and/or wherein the forming the cluster is based on determining a similarity measure of feature vectors calculated for the image regions in different frames among the at least two respective frames, wherein the similarity measure employed is one of Euclidean distance, Chebyschev distance, or cosine similarity.

17. The computer-readable storage medium according to claim 11, wherein the identifying the object further comprises: detecting one or more classes of the object; and wherein the recognizing of the identity of the object is based on at least one of the one or more detected classes of the object.

18. The apparatus according to claim 12, wherein the recognizing the identity of the object comprises:

computing a plurality of feature vectors for a plurality of image regions in the at least two respective frames, wherein computing of a feature vector of the plurality of feature vectors for a given frame includes determining a value of at least one feature of the image region of the given frame; and forming a cluster based on the feature vectors, wherein the cluster includes image regions of the at least two respective frames, the image regions including the object with the same recognized identity.

19. The apparatus according to claim 18, wherein the forming the cluster is performed by K-means approach; and/or wherein the forming the cluster is based on determining a similarity measure of feature vectors calculated for the image regions in different frames among the at least two respective frames, wherein the similarity measure employed is one of Euclidean distance, Chebyschev distance, or cosine similarity.

20. The apparatus according to claim 12, wherein the identifying the object further comprises: detecting one or more classes of the object; and wherein the recognizing of the identity of the object is based on at least one of the one or more detected classes of the object.

* * * * *